US012509021B2

(12) United States Patent
Yamamoto

(10) Patent No.: US 12,509,021 B2
(45) Date of Patent: Dec. 30, 2025

(54) VEHICLE-MOUNTED APPARATUS

(71) Applicant: YOKOWO CO., LTD., Tokyo (JP)

(72) Inventor: Tsugio Yamamoto, Tokyo (JP)

(73) Assignee: YOKOWO CO., LTD., Tokyo (JP)

( * ) Notice: Subject to any disclaimer, the term of this patent is extended or adjusted under 35 U.S.C. 154(b) by 218 days.

(21) Appl. No.: 18/565,527

(22) PCT Filed: Jul. 4, 2022

(86) PCT No.: PCT/JP2022/026571
§ 371 (c)(1),
(2) Date: Nov. 30, 2023

(87) PCT Pub. No.: WO2023/062890
PCT Pub. Date: Apr. 20, 2023

(65) Prior Publication Data
US 2024/0253596 A1 Aug. 1, 2024

(30) Foreign Application Priority Data
Oct. 15, 2021 (JP) ................. 2021-169790

(51) Int. Cl.
*B60R 25/24* (2013.01)
*B60R 25/01* (2013.01)
(Continued)

(52) U.S. Cl.
CPC .............. *B60R 25/24* (2013.01); *B60R 25/01* (2013.01); *B60R 25/10* (2013.01);
(Continued)

(58) Field of Classification Search
CPC ............ G07C 9/00944; G07C 9/00896; G07C 2009/00936; G07C 2009/0096;
(Continued)

(56) References Cited

U.S. PATENT DOCUMENTS 4,898,010 A * 2/1990 Futami ............... G07C 9/00309
70/389
6,460,386 B1 * 10/2002 Watanuki ............. E05B 19/046
70/456 R
(Continued)

FOREIGN PATENT DOCUMENTS

DE 102005059061 A1 * 6/2007 ......... G07C 9/00182
DE 102006001410 A1 * 7/2007 ......... G07C 9/00896
(Continued)

*Primary Examiner* — Yong Hang Jiang
(74) *Attorney, Agent, or Firm* — XSENSUS LLP

(57) ABSTRACT

A vehicle-mounted apparatus comprising: a main body portion; and an electronic key accommodating portion that accommodates an electronic key of a vehicle and is attachable to and detachable from the main body portion, wherein the electronic key accommodating portion includes a switching unit that switches detection states of a first detection unit and a second detection unit according to an attachment or detachment operation of the electronic key accommodating portion to or from the main body portion, the first detection unit is provided in the main body portion for detecting an accommodation state of the electronic key in the electronic key accommodating portion, and the second detection unit is provided in the main body portion for detecting an attachment or detachment state of the electronic key accommodating portion with respect to the main body portion.

12 Claims, 15 Drawing Sheets

(51) Int. Cl.
B60R 25/10 (2013.01)
G07C 9/00 (2020.01)

(52) U.S. Cl.
CPC ..... G07C 9/00896 (2013.01); G07C 9/00944 (2013.01); *B60R 2025/1016* (2013.01); *B60R 2325/205* (2013.01); *G07C 2009/00936* (2013.01); *G07C 2009/00952* (2013.01); *G07C 2009/0096* (2013.01); *G07C 2009/00992* (2013.01)

(58) Field of Classification Search
CPC ........... G07C 2009/00992; G07C 2009/00952; E05B 49/00; E05B 19/00; B60R 25/24; B60R 25/10; B60R 25/01; B60R 2025/1016; B60R 2325/205
See application file for complete search history.

(56) References Cited

U.S. PATENT DOCUMENTS

| | | | |
|---|---|---|---|
| 2015/0257503 A1* | 9/2015 | Packer | A45C 13/023 701/2 |
| 2020/0055487 A1* | 2/2020 | Tieman | B60R 25/24 |

FOREIGN PATENT DOCUMENTS

| | | | | |
|---|---|---|---|---|
| JP | 6710832 B1 * | 6/2020 | | |
| JP | 2021-095746 A | 6/2021 | | |
| WO | WO-2021054404 A1 * | 3/2021 | ......... | G07C 9/00944 |

* cited by examiner

IF YOU PUSH KEY TRAY LIGHTLY, KEY TRAY WILL COME OFF, AND THEN IT IS DETACHED.

OPEN LID AND DETACH ELECTRONIC KEY FROM INSIDE.

RETURN EMPTY KEY TRAY TO VEHICLE-MOUNTED APPARATUS.

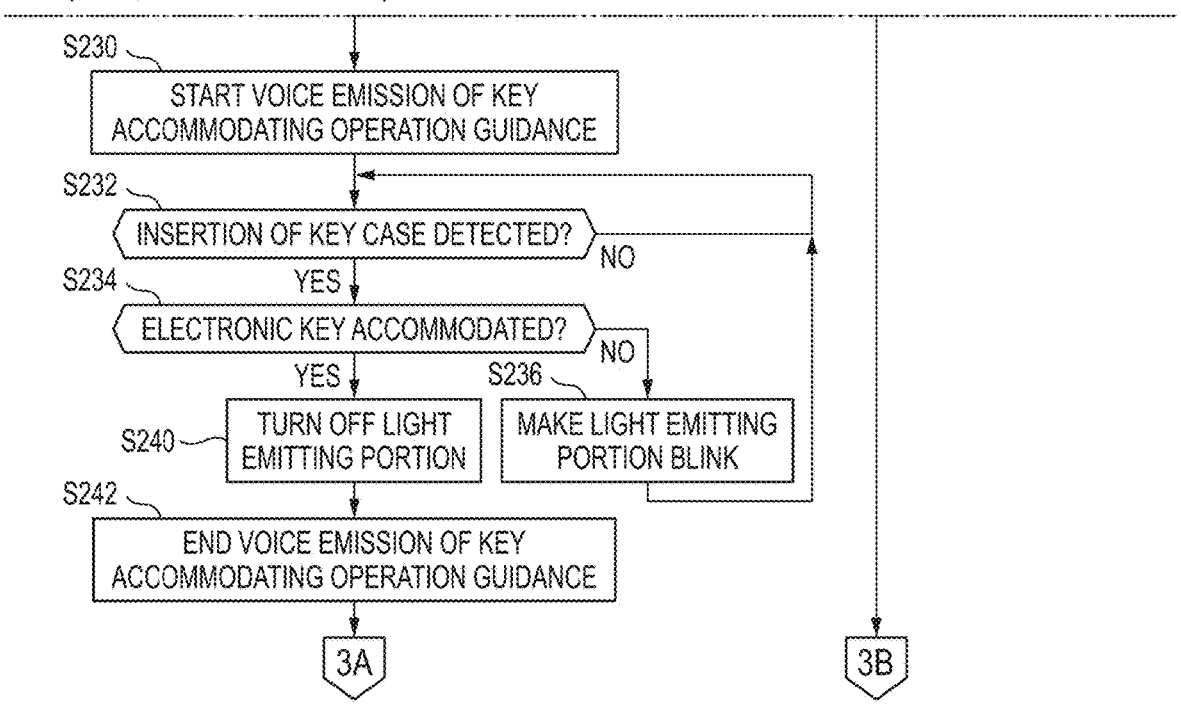

OPEN LID AND ACCOMMODATE ELECTRONIC KEY
WITH PUSH BUTTON FACING UPWARD.

RETURN KEY TRAY ACCOMMODATING ELECTRONIC KEY
TO VEHICLE-MOUNTED APPARATUS.

VEHICLE-MOUNTED APPARATUS

CROSS-REFERENCE TO RELATED APPLICATIONS

The present application is based on PCT filing PCT/JP2022/026571, filed Jul. 4, 2022, which claims priority to Japanese Patent Application No. 2021-169790, filed Oct. 15, 2021, the entire contents of each are incorporated herein by reference.

TECHNICAL FIELD

The present invention relates to an in-vehicle device that accommodates an electronic key for a vehicle.

BACKGROUND ART

As a usage form of vehicles, a plurality of people may share one vehicle or a plurality of vehicles. This usage form includes car sharing and rental cars. Hereinafter, such usage forms are collectively referred to as "sharing".

In sharing, it is important to handle a key for using the vehicle to be shared. For example, Patent Literature 1 discloses a technique of an in-vehicle device that accommodates an electronic key that can be used for sharing or the like.

CITATION LIST

Patent Literature

Patent Literature 1: JP2021-95746A

SUMMARY OF INVENTION

Technical Problem

However, in the in-vehicle device technique that accommodates the electronic key in the related art, there is still room for improvement in terms of a sense of security for users, and convenience including good usability and good comprehensibility in use.

An example of an object of the present invention is to improve the convenience of the in-vehicle device that accommodates an electronic key.

Solution to Problem

An aspect of the present invention is an in-vehicle device, including: a main body portion; and an electronic key accommodating portion that accommodates an electronic key of a vehicle and is attachable to and detachable from the main body portion, in which the electronic key accommodating portion includes a switching unit that switches detection states of a first detection unit and a second detection unit according to an attachment or detachment operation of the electronic key accommodating portion to or from the main body portion, and the first detection unit is provided in the main body portion for detecting an accommodation state of the electronic key in the electronic key accommodating portion, and the second detection unit is provided in the main body portion for detecting an attachment or detachment state of the electronic key accommodating portion with respect to the main body portion.

According to the above aspect of the present invention, both the accommodation state in the electronic key accom- modating portion and the attachment or detachment state of the electronic key accommodating portion with respect to the main body portion can be reliably detected according to the attachment or detachment operation of the electronic key accommodating portion to or from the main body portion. Therefore, it is possible to improve the convenience of the in-vehicle device that accommodates the electronic key.

BRIEF DESCRIPTION OF DRAWINGS

FIG. 19 is a diagram illustrating an example of guide display in the guidance control for service-in.

FIG. 20 is a diagram illustrating an example of guide display in the guidance control for service-in.

FIG. 21 is a diagram illustrating an example of guide display in the guidance control for service-in.

DESCRIPTION OF EMBODIMENTS

Figure 1:
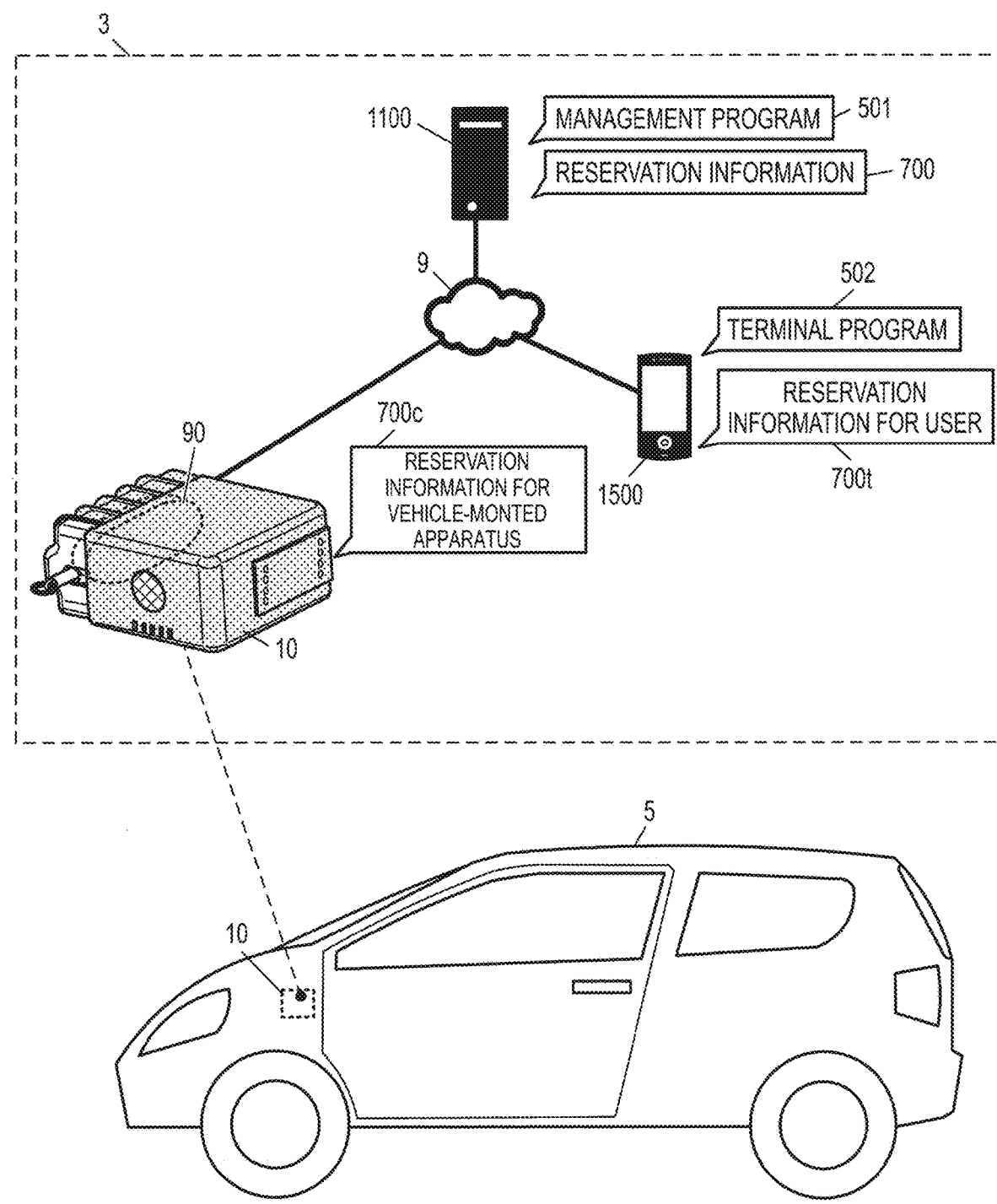
FIG. 1 is a diagram illustrating an example of a system configuration of a sharing system.

Hereinafter, an embodiment example to which the present invention is applied will be described, but embodiments to which the present invention can be applied are not limited to the following aspects. Modifications, additions, and omissions of constituent elements are possible as long as they do not deviate from the gist of the invention.

For reference purposes, a right-handed orthogonal triaxial coordinate system (X, Y, and Z) that indicates directions are shown as appropriate in the drawings that need to indicate directions for explaining an in-vehicle device. Description will be made with a Z-axis plus direction as an upper side, a Z-axis minus direction as a lower side, an X-axis plus direction as a front side, an X-axis minus direction as a rear side, a Y-axis plus direction as a left side (for the in-vehicle device), and a Y-axis minus direction as a right side (for the in-vehicle device).

FIG. 1 is a diagram illustrating an example of a system configuration of a sharing system. A sharing system 3 includes a vehicle-mounted apparatus 10, a server system 1100, and a user terminal 1500. The apparatus 10 accommodates an electronic key 90 of a vehicle 5 to be shared. The server system 1100 communicates with the in-vehicle device 10 via a network 9. The user terminal 1500 communicates with the in-vehicle device 10 and the server system 1100 via the network 9. A "user" in the present description is a person who uses the vehicle 5, that is, an end user.

The network 9 means a communication channel capable of data communication. The network 9 includes not only a dedicated line (dedicated cable) for direct connection and a local area network (LAN) such as the Ethernet (registered trademark), but also communication networks such as telephone communication networks, cable networks, the Internet, and short-range wireless communication network, and a communication method may be wired or wireless.

The server system 1100 performs user registration of the sharing system 3, reservation management, and provision of reservation information to the user terminal 1500 and the apparatus 10. Specifically, by storing a management program 501 and executing the stored management program 501, the server system 1100 implements (1) a user registration function, (2) a reservation setting function for the vehicle 5, (3) a function of generating reservation information 700 (including, for example, a unique reservation ID, a reserved vehicle ID, a reservation period, a password, and the like), (4) a function of providing a copy of the reservation information 700 (reservation information for user 700t) to the user terminal 1500, and (5) a function of providing a copy of the reservation information 700 (reservation information for in-vehicle device 700c) to the apparatus 10.

The user terminal 1500 is a terminal capable of communicating with the network 9 and is a computer system used by the user who desires the sharing service of the vehicle 5. For example, the user terminal 1500 is implemented by a smartphone, a tablet computer, a notebook computer, a wearable computer, or the like.

The user terminal 1500 can store an application program and execute the stored application program. The user terminal 1500 stores a terminal program 502 as the application program. By executing the terminal program 502, the user terminal 1500 implements (1) a function of accessing the server system 1100 to perform a reservation procedure of the vehicle 5, and acquiring and storing the reservation information for user 700t, (2) a function of performing data communication with the apparatus 10, (3) a function of providing the reservation information for user 700t and receiving certification in a state where communication with the apparatus 10 is possible. (4) a function of performing a predetermined unlock request to the apparatus 10 in response to an unlock operation on the user terminal 1500 by the user after certification, and unlocking, and (5) a function of performing a predetermined lock request to the apparatus 10 in response to a lock operation on the user terminal 1500 by the user after certification, and locking.

The apparatus 10 is mounted on the vehicle 5 to be shared. The apparatus 10 is disposed inside a vehicle (for example, inside a glove box, on a dashboard, inside a console box, underfoot of a driver seat or a passenger seat, in a trunk room, or the like).

Figure 2:
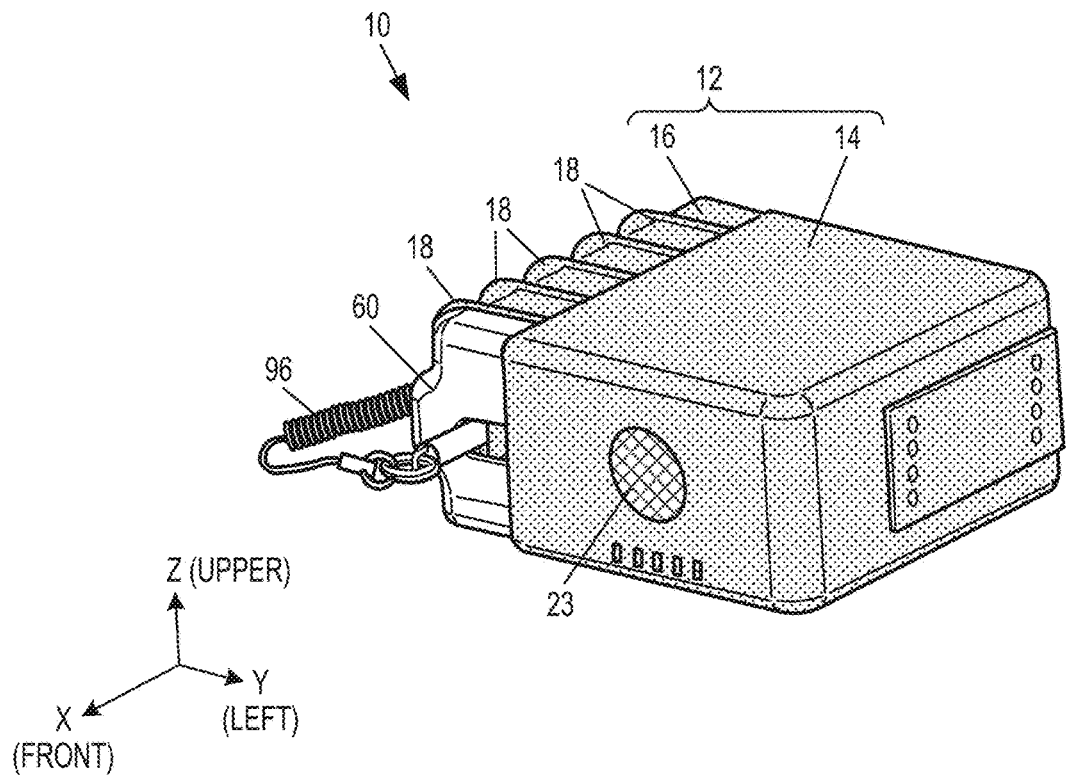
FIG. 2 is a perspective external view seen from a diagonally upper left front side, which illustrates a configuration example of an in-vehicle device.
Figure 3:
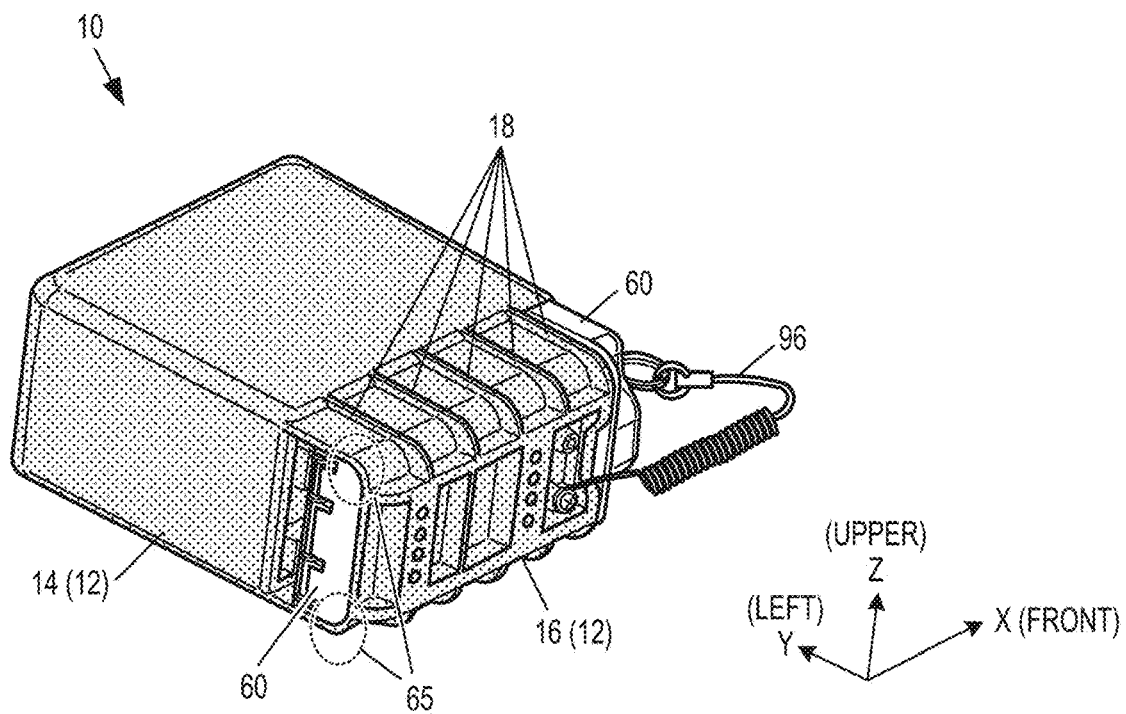
FIG. 3 is a perspective external view seen from a diagonally upper right rear side, which illustrates the configuration example of the in-vehicle device.
Figure 4:
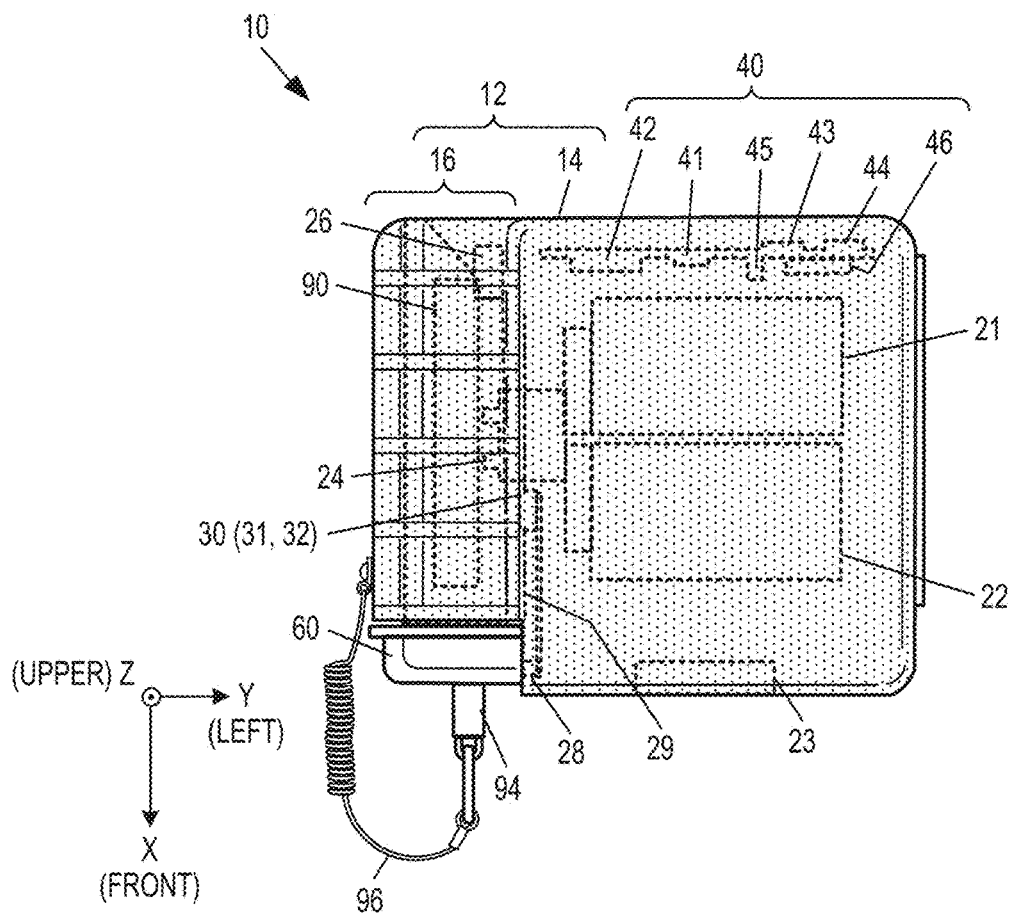
FIG. 4 is an external view seen from directly above, which illustrates the configuration example of the in-vehicle device.

FIG. 2 is a perspective extremal view of the apparatus 10 as seen from a diagonally upper left front side. FIG. 3 is a perspective external view of the apparatus 10 as seen from a diagonally upper right rear side. FIG. 4 is an external view of the apparatus 10 as seen from directly above. In FIG. 4, main components incorporated in the apparatus 10 are shown transparently with dashed lines.

As shown in FIGS. 2 to 4, the apparatus 10 includes a main body portion 12 and a key tray portion 60. The key tray portion 60 is an "electronic key accommodating portion" that accommodates an electronic key 90 of the vehicle 5 and is attachable to and detachable from the main body portion 12. FIGS. 2 to 4 all illustrate an attached state in which the key tray portion 60 accommodating the electronic key 90 is attached to the main body portion 12. In the drawings, the main body portion 12 is shaded so that the main body portion 12 and the key tray portion 60 can be easily distinguished.

The main body portion 12 includes a main case portion 14 defining a main internal space for incorporating electric and electronic components and various mechanical portions, and a tray attachment portion 16, which is a structural portion to which the key tray portion 60 is inserted and attached, and has a through shape formed into a cylindrical space along the X-axis direction. The X-axis direction is an operating direction for attaching and detaching the key tray portion 60. The tray attachment portion 16 and the key tray portion 60 may be connected by a curled cord 96.

The main case portion 14 includes a first actuator 21, a second actuator 22, a speaker 23, a transmission mechanism 24, an engaging portion 26, a light emitting portion 28, a light guiding and scattering portion 29, a switch unit 30, and a control unit 40.

As shown in FIG. 4, the control unit 40 includes a central processing Unit (CPU) 41, an IC memory 42, a first communication unit 43, a second communication unit 44, an in-vehicle network communication IC 45, and an operation control unit 46. The control unit 40 integrally controls operation of the apparatus 10 by causing the CPU 41 to execute programs stored in the IC memory 42. Guidance control based on a combination of a detection result of an attachment detection switch unit 31 and a detection result of a key detection switch unit 32 is included in the integral control.

The first communication unit 43 is implemented by, for example, a wireless communication module, is connected to the network 9, and communicates with the server system 1100. The second communication unit 44 is implemented by, for example, a short-range wireless communication module, and communicates with the user terminal 1500 of the user using the vehicle 5 within a predetermined communication range.

The in-vehicle network communication IC 45 is connected to an in-vehicle network of the vehicle 5 and acquires the latest vehicle state information of the vehicle 5 from an in-vehicle computer (for example, a power train system MCU, or a body system MCU).

The operation control unit 46 is implemented by, for example, a power control circuit, and when receiving an instruction to open or close a door of the vehicle 5 from the user terminal 1500, the operation control unit 46 supplies power to operate either the first actuator 21 or the second actuator 22 according to a type of the instruction.

Figure 5:
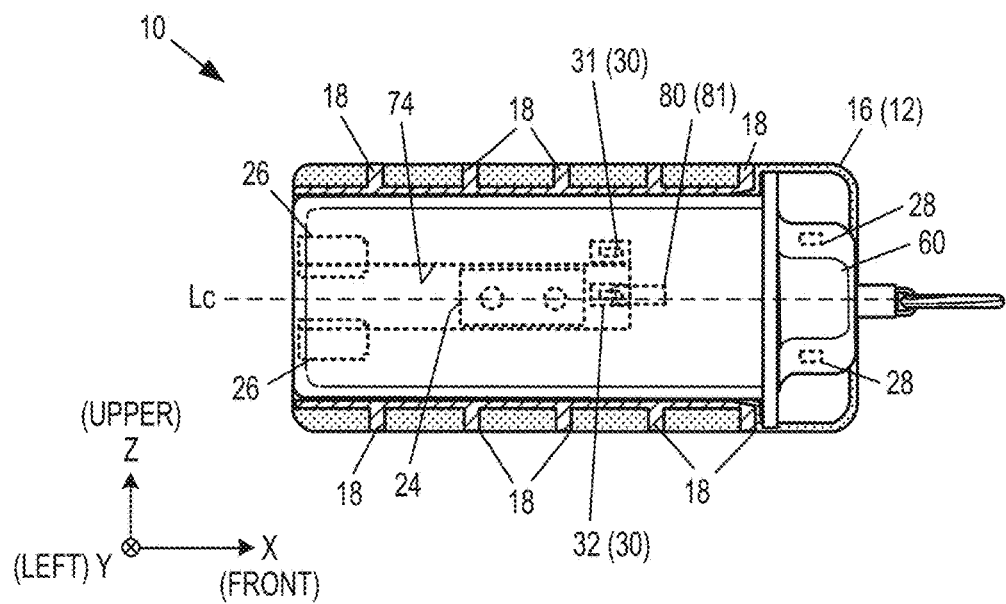
FIG. 5 is a cross-sectional view in an X-Z direction around a tray attachment portion with a key tray portion attached.
Figure 6:
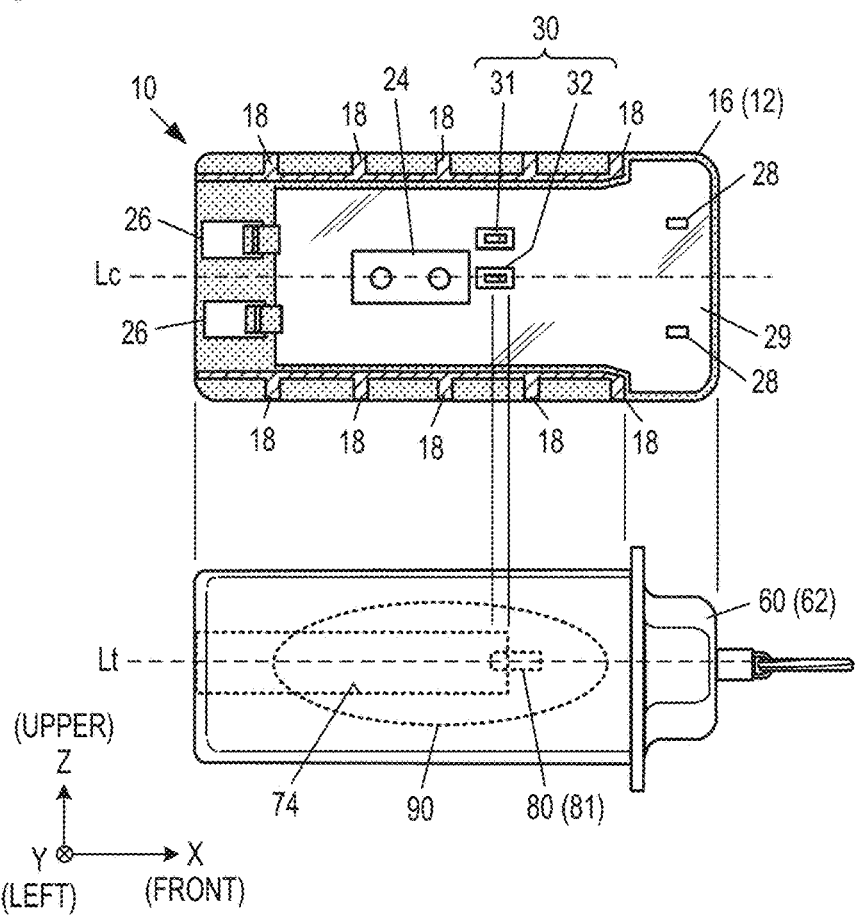
FIG. 6 is a diagram illustrating a cross-sectional view in the X-Z direction around the tray attachment portion without the key tray portion attached and the key tray portion.

FIG. 5 is a cross-sectional view in an X-Z direction around the tray attachment portion 16 with the key tray portion 60 attached. FIG. 6 is a diagram illustrating a cross-sectional view in the X-Z direction around the tray attachment portion 16 without the key tray portion 60 attached on an upper side, aligned with the key tray portion 60 on a lower side, so that the position in the X-axis direction corresponds to the position in an attached state. In FIGS. 5 and 6, the main body portion 12 is shaded so that the main body portion 12 and the key tray portion 60 can be easily distinguished.

The tray attachment portion 16 includes rib-shaped strength structures 18 provided along a Y-Z plane on an outer side thereof. Inner surfaces of the tray attachment portion 16 (two surfaces parallel to an X-Z plane and two surfaces parallel to an X-Y plane) are planar (smooth). The number of the strength structures 18 can be set as appropriate. The ribs forming the strength structures 18 are not limited to the direction parallel to the Y-Z plane, and may be provided along a direction parallel to the X-Z plane, or may be provided along other directions.

The matter that the inner surfaces of the tray attachment portion 16 is "planar" does not mean that the inner surfaces are perfectly flat surfaces. It suffices that the inner surfaces are formed smoothly so that the inner surfaces are continuous while allowing for some unevenness such as joints and lightening portions of components.

By making the inner surfaces of the tray attachment portion 16 planar, when the key tray portion 60 is inserted into the tray attachment portion 16, the inner surfaces are in sliding contact with outer surfaces of the key tray portion 60 and function as guide surfaces that can guide the insertion smoothly. The tray attachment portion 16 also has a through shape that forms a cylindrical space along the X-axis direction, which is an attachment direction to the tray attachment portion 16.

Therefore, even when there is a foreign matter (for example, waste paper) in the cylindrical space of the tray attachment portion 16, the user can quickly find the foreign matter and remove the foreign matter easily and quickly.

The tray attachment portion 16 includes the transmission mechanism 24 as an element protruding from a surface in a Y-axis plus direction (the surface close to the first actuator 21 and the second actuator 22) of the two surfaces parallel to the X-Z direction that constitute the inner surfaces of the cylindrical space. The transmission mechanism 24 is a mechanism that transmits a force of a pushing operation by the first actuator 21 and the second actuator 22 to a push button of the electronic key 90.

The first actuator 21 and the second actuator 22 are drive units that operate under drive control by the control unit 40 to perform the pushing operation. Specifically, the first actuator 21 and the second actuator 22 are implemented by push-type linear solenoids, and push a movable portion (a push rod connected to a movable iron core) in a Y-axis minus direction by electromagnetic force as a drive current is applied.

The operations of the first actuator 21 and the second actuator 22 are transmitted via the transmission mechanism 24 to push buttons (unlock push button, lock push button) of the electronic key 90 accommodated in the key tray portion 60 in the attached state.

The transmission mechanism 24 includes a first link mechanism that transmits the operation of the push rod of the first actuator 21 to one of the unlock push button and the lock push button of the electronic key 90 accommodated in the key tray portion 60. The transmission mechanism 24 includes a second link mechanism that transmits the operation of the push rod of the second actuator 22 to the other of the unlock push button and the lock push button of the electronic key 90 accommodated in the key tray portion 60.

A disposing position relation between the unlock push button and the lock push button on a push button disposition surface of the electronic key 90 varies depending on a type of the electronic key 90. The transmission mechanism 24 is prepared with a plurality of different specifications of the link structure corresponding to the type of the electronic key 90, and is replaced with a type of transmission mechanism 24 that matches the type of the electronic key 90 of the vehicle 5 to which the apparatus 10 is mounted.

The transmission mechanism 24 partially protrudes from the surface in the Y-axis plus direction (the surface close to the first actuator 21 and the second actuator 22) of the two surfaces parallel to the X-Z direction that constitute the inner surfaces of the cylindrical space of the tray attachment portion 16. When the key tray portion 60 is attached to the main body portion 12, this protruding portion is at a position corresponding to a window portion 74 (see FIGS. 6 and 7) of the key tray portion 60, and being adjacent to the push buttons of the electronic key 90 accommodated in the key tray portion 60.

The first actuator 21 and the second actuator 22 perform the pushing operation with respect to the electronic key 90 accommodated in the key tray portion 60 attached to the main body portion 12 via the transmission mechanism 24.

As shown in FIG. 6, the transmission mechanism 24 is disposed along a center line Lc that passes through a middle position of the tray attachment portion 16 in a Z-axis direction (a line facing a center line Lt that passes through a middle position in the Z-axis direction of the electronic key 90 accommodated in the key tray portion 60 in the attached state).

The engaging portion 26 is a mechanism that switches between an engaged state of being engaged with the key tray portion 60 attached to the main body portion 12 and a disengaged state of not being engaged. By being in the engaged state, the engaging portion 26 functions to prevent the key tray portion 60 from moving in the X-axis direction within the cylindrical space of the tray attachment portion 16, and hold the key tray portion 60 at a predetermined position in the attached state.

In the present embodiment, the engaging portion 26 will be described as being implemented by a "push latch". The engaging portion 26 includes a passive portion (a part that receives an operating force), an engaging protrusion (a part that moves according to a stroke of the passive portion), and a main portion (a part that corresponds to a housing that incorporates the passive portion, and the like). The passive portion is biased in the X-axis plus direction by a spring incorporated in the main portion. By this biasing, the engaging portion 26 is provided in such a posture that the passive portion strokes along the X-axis direction and the engaging protrusion faces in the Y-axis minus direction. The engaging portion 26 has a function of determining an insertion limit position of the key tray portion 60 and a function of notifying the user that the key tray portion 60 is inserted to a correct position by a tactile operation feeling by the latch.

The engaging portion 26 may be implemented by a mechanical element other than the push latch. For example, it may be implemented by a snap fit, a magnet, a magnet latch, a hook-and-loop fastener, or the like.

The light emitting portion 28 is an element that emits light toward the light guiding and scattering portion 29 and the light guide portion 62 of the attached key tray portion 60. The light emitting portion 28 can be implemented by, for example, an LED.

The light guiding and scattering portion 29 is a plate-like member made of a synthetic resin material having light guiding and light scattering properties. The light guiding and scattering portion 29 is fitted in the surface in the Y-axis plus direction (the surface close to the first actuator 21 and the second actuator 22) of the two surfaces parallel to the X-Z direction that constitute the inner surfaces of the tray attachment portion 16. The light guiding and scattering portion 29 guides the light emitted by the light emitting portion 28 and scatters the light in a plane toward the inner surfaces of the tray attachment portion 16.

The switch unit 30 is in contact with the key tray portion 60 attached to the main body portion 12 to switch between ON and OFF. The switch unit 30 includes the attachment detection switch unit 31 and the key detection switch unit 32. As shown in FIGS. 5 and 6, the attachment detection switch unit 31 and the key detection switch unit 32 are exposed on the surface in the Y-axis plus direction of the two surfaces parallel to the X-Z direction that constitute the inner surfaces of the tray attachment portion 16. The key detection switch unit 32 is disposed on the center line Lc that passes through the middle position in the Z-axis direction.

The attachment detection switch unit 31 is a second detection unit provided in the main body portion 12 for detecting the attachment or detachment state of the key tray portion 60 with respect to the main body portion 12. The attachment detection switch unit 31 is implemented by, for example, a slide switch (specifically, a switch that turns to an ON state when a slider is pushed and moves, and returns to an OFF state when an external force acting on the slider disappears), and detects that the key tray portion 60 is attached to the main body portion 12. Note that when the detection state of the attachment detection switch unit 31 is the ON state, it indicates that the key tray portion 60 is attached to the main body portion 12, and when the detection state is the OFF state, it indicates that the key tray portion 60 is not attached to (detected from) the main body portion 12.

The key detection switch unit 32 is a first detection unit provided in the main body portion 12 for detecting the accommodation state of the electronic key 90 in the key tray portion 60. The key detection switch unit 32 is implemented by, for example, a lever-type switch similar to the attachment detection switch unit 31. The key detection switch unit 32 detects a displacement state of a movable portion 80 by being in contact with the movable portion 80 of the key tray portion 60 when the key tray portion 60 is attached to the main body portion 12. By detecting the displacement state, the key detection switch unit 32 indirectly detects that the electronic key 90 is accommodated in the key tray portion 60. When the detection state of the key detection switch unit 32 is the ON state, it indicates that the electronic key 90 is accommodated in the key tray portion 60, and when the detection state is the OFF state, it indicates that the electronic key 90 is not accommodated in the key tray portion 60.

Figure 7:
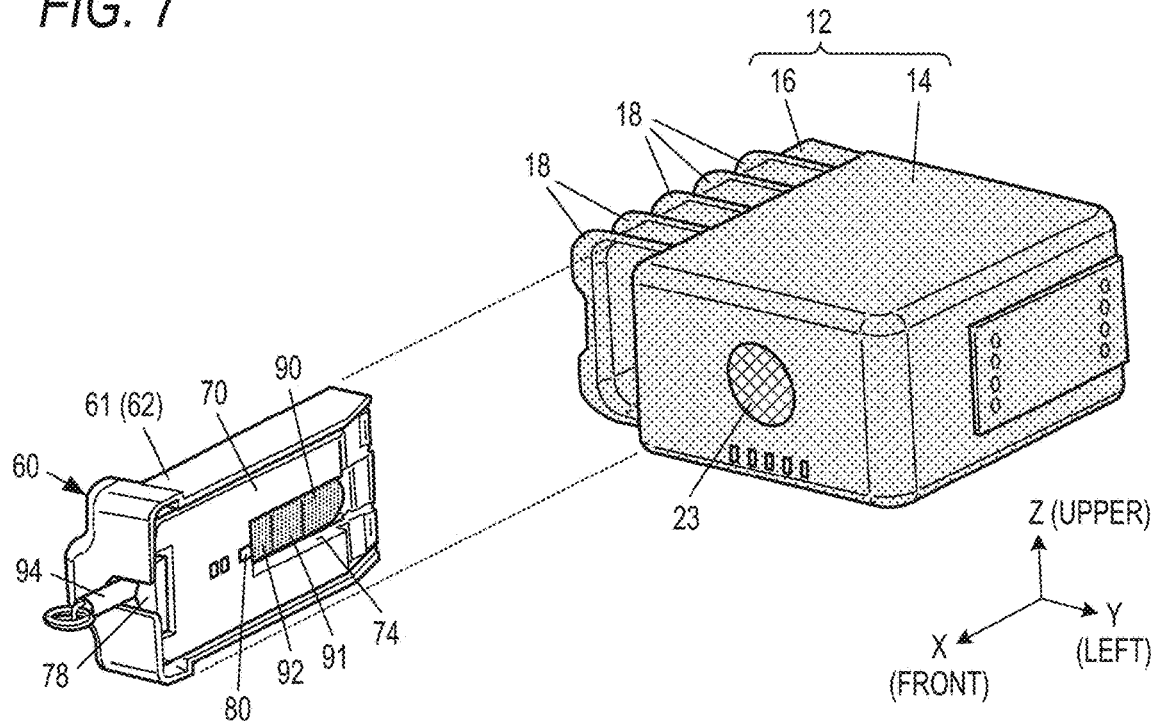
FIG. 7 is a perspective external view illustrating a configuration example of the key tray portion.
Figure 8:
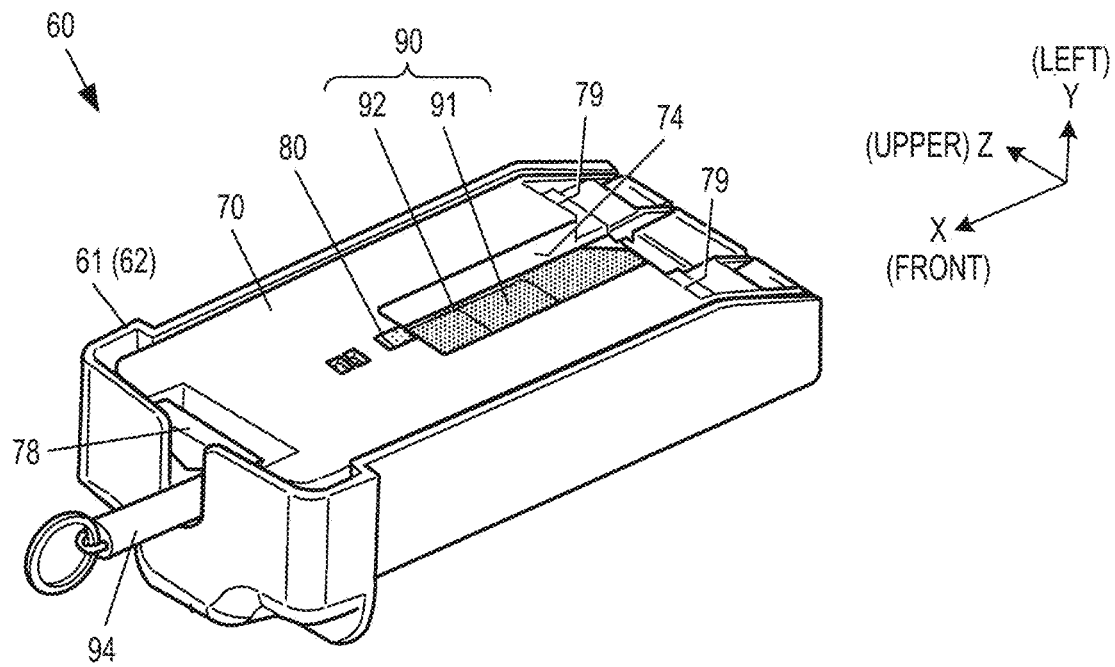
FIG. 8 is a perspective external view illustrating the configuration example of the key tray portion.
Figure 9:
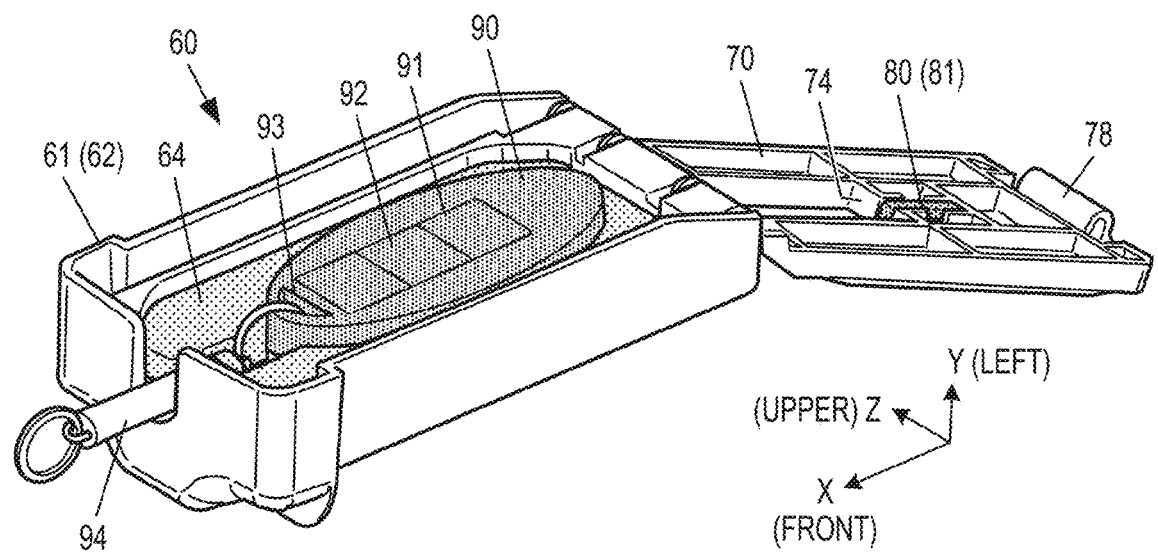
FIG. 9 is a perspective external view illustrating the configuration example of the key tray portion.

FIG. 7 is an example of a perspective external view showing a configuration example of the key tray portion 60, which is seen from the diagonally upper left front side. FIG. 7 illustrates a detached state in which the key tray portion 60 is detached from the main body portion 12. FIG. 8 is an example of a perspective external view showing the configuration example of the key tray portion 60, which illustrates a state in which the electronic key 90 is accommodated and a lid portion 70 is closed. FIG. 9 is an example of a perspective external view showing the configuration example of the key tray portion 60, which illustrates a state in which the electronic key 90 is accommodated and a lid portion 70 is opened.

The key tray portion 60 includes an accommodating portion 61 that accommodates the electronic key 90, a key fitter 64, and a lid portion 70 that opens and closes an opening of the accommodating portion 61 in the Y-axis plus direction, and accommodates the electronic key 90 in a detachable manner.

The accommodating portion 61 is made of a synthetic resin material having light guiding and light scattering properties. The entire accommodating portion 61 serves as a light guide portion 62 made of a light guiding material. The color of the accommodating portion 61 can be, for example, slightly opaque and translucent. Only a front portion of the accommodating portion 61 (a front portion when attached to the main body portion 12; a portion in the X-axis plus direction) may be made of the light guiding material.

The accommodating portion 61 includes an incorrect assembly prevention structure 65 that makes attachment to the main body portion 12 possible by setting a posture with respect to the main body portion 12 to a predetermined relative posture (see FIG. 3). Specifically, a side surface of the accommodating portion 61 in the Y-axis minus direction has a curved shape at corners in the Z-axis plus direction and the Z-axis minus direction. This curved shape is a side view shape of the accommodating portion 61 when viewed in a direction of inserting the key tray portion 60 into the tray attachment portion 16 (a direction along the X-axis). An inner surface shape of the tray attachment portion 16 is a shape that fits into this side view shape. According to this fitting shape, the key tray portion 60 cannot be inserted into and attached to the tray attachment portion 16 unless the curved corners of the key tray portion 60 and the inner surface shape of the tray attachment portion 16 are matched with each other.

The key fitter 64 (see FIG. 9) is a member obtained by hollowing out an accommodating range for the electronic key 90 along an external shape of the electronic key 90 from a rigid sponge plate. The key fitter 64 positions the electronic key 90 accommodated in the accommodating portion 61 so that the unlock push button 91 and the lock push button 92 are at predetermined positions of the accommodating portion 61. A plurality of types of the key fitters 64 corresponding to the types of the electronic key 90 are prepared in advance, and the key fitter 64 is replaced with a type corresponding to the type of the electronic key 90 of the vehicle 5 to which the apparatus 10 is mounted.

The electronic key 90 is accommodated with one end of a connecting member 94 attached to a key ring hole 93, and with a push button disposition surface directed in the Y-axis plus direction (an opening direction of the accommodating portion 61). The other end of the connecting member 94 is brought out of the accommodating portion 61.

Any ornaments, parts, or the like can be attached to the other end of the connecting member 94. For example, a tag describing the number of the vehicle 5 in which the apparatus 10 is mounted, a key holder, or the like can be disposed. As shown in FIG. 4, one end of the curled cord 96 with the other end connected to the main body portion 12 may be attached to the connecting member 94.

Figure 10:
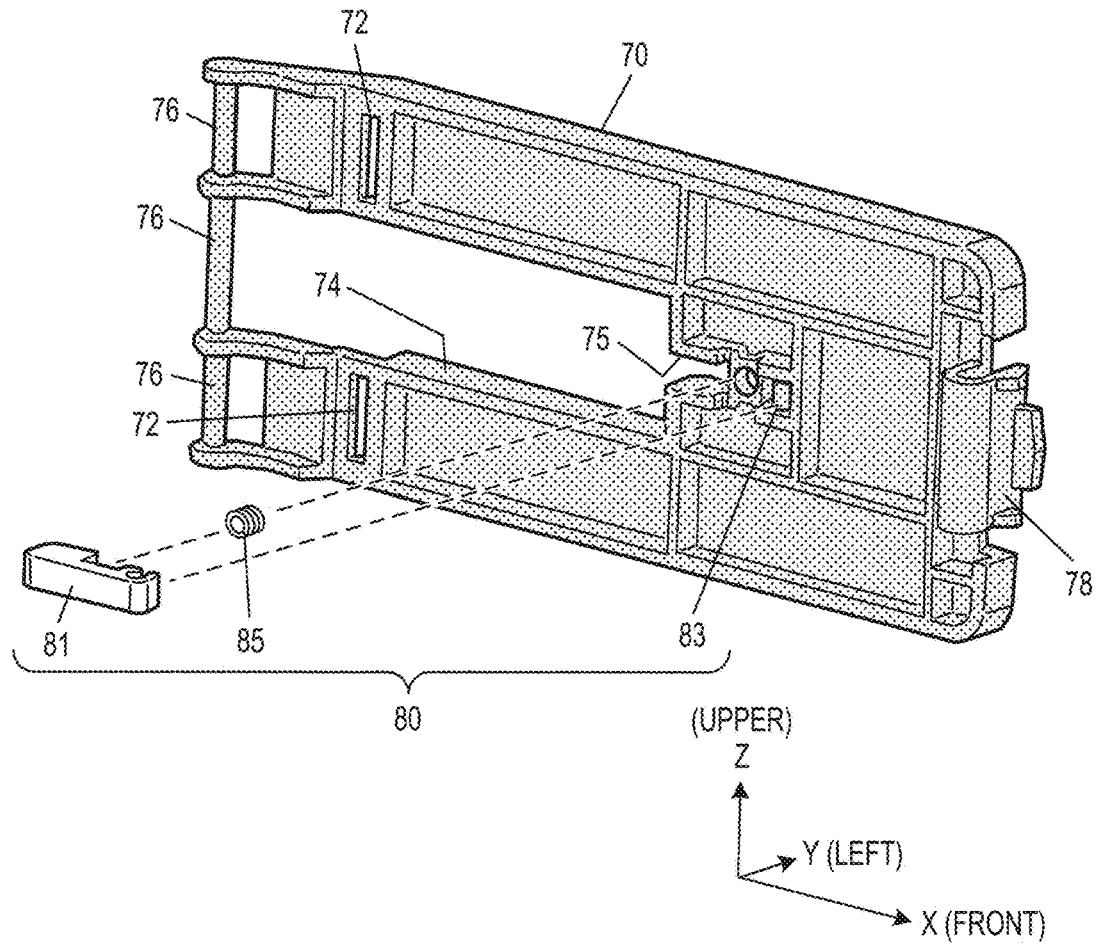
FIG. 10 is a perspective view illustrating a configuration example of a lid portion of the key tray portion.

FIG. 10 is a perspective view illustrating a configuration example of the lid portion 70, which illustrates the inside of the lid portion 70. The coordinate axes in FIG. 10 are coordinate axes in a state in which the key tray portion 60 with the lid portion 70 closed is attached to the main body portion 12.

The lid portion 70 functions as a switching unit that switches the detection states of the attachment detection switch unit 31 and the key detection switch unit 32 according to the attachment or detachment operation of the key tray portion 60 to or from the main body portion 12. Specifically, the lid portion 70 includes an engaging hole 72, a window portion 74, a lid shaft 76, a snap fit 78, and a movable portion 80.

The engaging hole 72 is a hole into which the engaging protrusion of the engaging portion 26 (see FIG. 6) is inserted. A concave portion may be used instead of the hole.

The window portion 74 is an opening through which the push buttons (the unlock push button 91 and the lock push button 92) of the electronic key 90 accommodated in the key tray portion 60 are exposed. A notch portion 75 is provided in the center of a front end side of the window portion 74 in the lid portion 70. Inclined surfaces 74s that incline toward a right-rear direction (X-axis minus direction and Y-axis minus direction; see FIG. 8; the direction of the key tray portion 60 alone is obliquely backward and downward when the key tray portion 60 is viewed from above with the lid portion 70 regarded as above the key tray portion 60) are provided on both sides in the Z-axis direction across the notch portion 75 on the front end side (X-axis plus direction) of the window portion 74 of the lid portion 70 (see FIG. 11). The detection state of the attachment detection switch unit 31 becomes the ON state when being in contact with the inclined surface 74s of the lid portion 70. When the key tray portion 60 is attached to the tray attachment portion 16, the inclined surface 74s of the lid portion 70 comes into contact with the attachment detection switch unit 31 to assist smooth operation thereof. In other words, excessive shock is prevented from being applied in the operation of the attachment detection switch unit 31.

The lid shaft 76 is a shaft for connecting the lid portion 70 to the accommodating portion 61 in a swinging manner. The snap fit 78 engages the lid portion 70 with the accommodating portion 61 in an openable and closable manner.

The movable portion 80 is positioned in contact with the push button disposition surface of the electronic key 90 accommodated in the key tray portion 60 (a user operation surface provided with the unlock push button 91 and the lock push button 92), and is displaced depending on whether the electronic key 90 is accommodated.

Specifically, the movable portion 80 includes a swinging lever 81, a swing shaft 83 of the lever 81, and a coil spring 85 that biases the lever 81 toward the inside of the lid portion 70 (the side facing the accommodated electronic key 90). The lever 81 is provided on the lid portion 70 in a manner of being rotatable in the Y-axis plus direction and the Y-axis minus direction with the swing shaft 83 as a fulcrum.

The lever 81 swings while being fitted in the notch portion 75. When the electronic key 90 is accommodated, the lever 81 is in contact with the push button disposition surface of the electronic key 90 and compresses the coil spring 85. An outer surface of the lever 81 in the Y-axis plus direction is substantially flush with an outer surface of the lid portion 70 in the Y-axis plus direction (a state shown in FIG. 8). A rear portion of the lever 81 (an end portion of the lever 81 in the X-axis minus direction) includes an inclined surface 81s (see FIG. 11) similar to the inclined surface 74s of the lid portion 70. The inclined surface 81s of the lever 81 is substantially flush with the inclined surface 74s of the lid portion 70 when the outer surface thereof in the Y-axis plus direction is substantially flush with the outer surface of the lid portion 70 in the Y-axis plus direction. The detection state of the key detection switch unit 32 becomes the ON state when being in contact with the inclined surface 81s of the lever 81.

When the electronic key 90 is not accommodated, the lever 81 is swung inwardly of the accommodating portion 61 by a biasing force of the coil spring 85. In this state, the outer surface of the lever 81 in the Y-axis plus direction is positioned inside the accommodating portion 61 relative to the outer surface of the lid portion 70 in the Y-axis plus direction, and is recessed from the outer surface of the lid portion 70 in the Y-axis plus direction.

That is, when the electronic key 90 is accommodated in the accommodating portion 61, the lever 81 is in contact with the push button disposition surface of the electronic key 90 by moving the lid portion 70 in a closing direction, and swings in the Y-axis plus direction against the biasing force of the coil spring 85. When the electronic key 90 is not accommodated in the accommodating portion 61, even when the lid portion 70 is moved in the closing direction, the lever 81 does not have the push button disposition surface of the electronic key 90. Therefore, the lever 81 does not swing in the Y-axis plus direction due to the biasing force of the coil spring 85.

Figure 11:
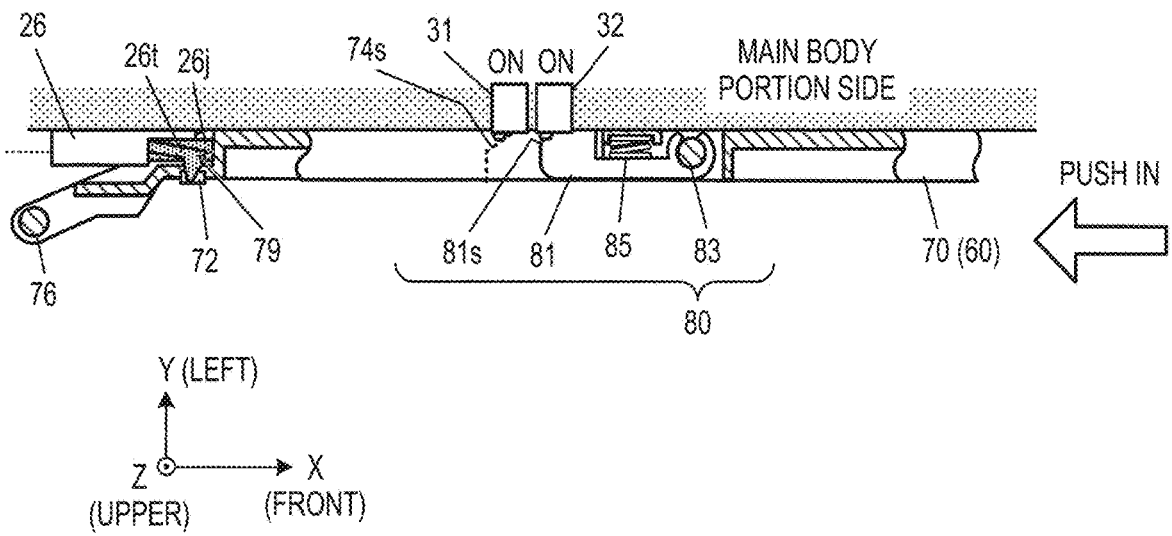
FIG. 11 is a state transition diagram for explaining a procedure of detaching the key tray portion from a main body portion.
Figure 12:
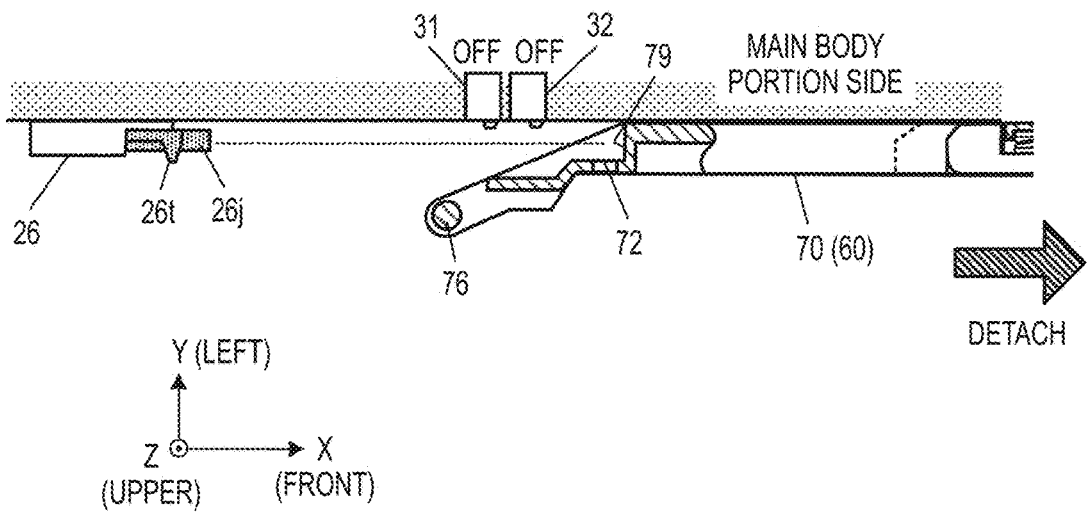
FIG. 12 is a state transition diagram for explaining the procedure of detaching the key tray portion from the main body portion.

FIGS. 11 and 12 are state transition diagrams for explaining a procedure of detaching the key tray portion 60 from the main body portion 12, and are cross-sectional views in the X-Y direction selectively illustrating peripheries of the lid portion 70. The attachment detection switch unit 31 is originally disposed side by side along the Z-axis direction together with the key detection switch unit 32 (see FIG. 6). However, in order to make the explanation easier to understand, the attachment detection switch unit 31 is shown shifted in the X-axis minus direction (to the left side as viewed in FIGS. 11 and 12) from the original position. In FIGS. 11 and 12, a front end portion of the window portion 74 is indicated by a dashed line shifted from the rear end portion of the lever 81 in the X-axis minus direction. The inclined surface 74s is provided on a front end side of the window portion 74 in the lid portion 70, and the inclined surface 81s inclined in the same direction as the inclined surface 74s is provided on the rear end portion of the lever 81.

As shown in FIG. 11, when the key tray portion 60 is attached to the main body portion 12, a passive portion 26j of the engaging portion 26 is in an engaged state of being in contact with a stepped portion 79 formed on the lid portion 70. In the engaged state, the engaging portion 26 protrudes an engaging protrusion 26t. The engaging protrusion 26t fits into the engaging hole 72 of the lid portion 70.

As for the switch unit 30, the detection state of the attachment detection switch unit 31 becomes the ON state when being in contact with the inclined surface 74s of the lid portion 70. Since the detection state is the ON state, the control unit 40 can recognize that the key tray portion 60 is attached to the main body portion 12.

When the electronic key 90 is accommodated in the key tray portion 60, the lever 81 is in a state such that the outer surface of a swinging end of the lever 81 in the Y-axis plus direction is substantially flush with the outer surface of the lid portion 70 in the Y-axis plus direction as shown in FIG. 11, and the inclined surface 81s of the lever 81 is also substantially flush with the inclined surface 74s of the lid portion 70. The key detection switch unit 32 is disposed at a position facing the outer surface of the swinging end of the lever 81 in the Y-axis plus direction, and the detection state thereof becomes the ON state when being in contact with the inclined surface 81s of the lever 81. Since the detection state is the ON state, the control unit 40 can recognize that the electronic key 90 is accommodated in the key tray portion 60.

In order to detach the key tray portion 60 from the main body portion 12, the user operates to push the key tray portion 60 in the X-axis minus direction. The engaging portion 26 is a push latch. Therefore, when the key tray portion 60 is in the attached state, it is in an engaged state, but when the key tray portion 60 is further pushed in, the engaging protrusion 26t is released from the engaging hole 72, and the engaging portion 26 is changed from the engaged state to the disengaged state.

When the passive portion 26j is pushed in the X-axis minus direction, it is slightly pushed back in the X-axis plus direction by the biasing force of the spring incorporated in the engaging portion 26 and stops. By pushing back the passive portion 26j, the key tray portion 60 is displaced in the X-axis minus direction so as to protrude slightly from the cylindrical space of the tray attachment portion 16. The user knows that the key tray portion 60 is removed from the main body portion 12 by this displacement, and detaches the key tray portion 60 from the tray attachment portion 16 as shown in FIG. 12. When the attached state of the key tray portion 60 is released, that is, the engaging protrusion 26t is released from the engaging hole 72, and is slightly moved in the X-axis plus direction by the biasing force of the spring incorporated in the engaging portion 26, both the attachment detection switch unit 31 and the key detection switch unit 32 are restored to original positions thereof while the contact between the inclined surface 74s of the lid portion 70 and the inclined surface 81s of the lever 81 is released. Then, the detection states of the attachment detection switch unit 31 and the key detection switch unit 32 are switched from the ON state to the OFF state. In this way, it is detected that the key tray portion 60 is detached from the main body portion 12.

After the key tray portion 60 is detached from the tray attachment portion 16, the user can operate the snap fit 78 to open the lid portion 70 (see FIG. 9) and take out the accommodated electronic key 90 with hand.

After the electronic key 90 is taken out, the lid portion 70 is closed, and the key tray portion 60 without the electronic key 90 accommodated therein is inserted and attached again into the tray attachment portion 16.

Figure 13:
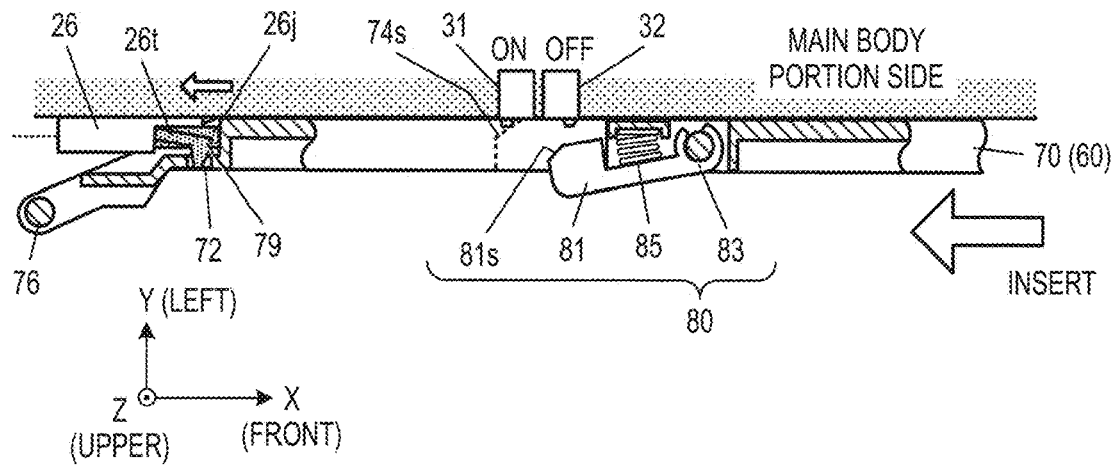
FIG. 13 is a state transition diagram for explaining a procedure of attaching the key tray portion to the main body portion.
Figure 14:
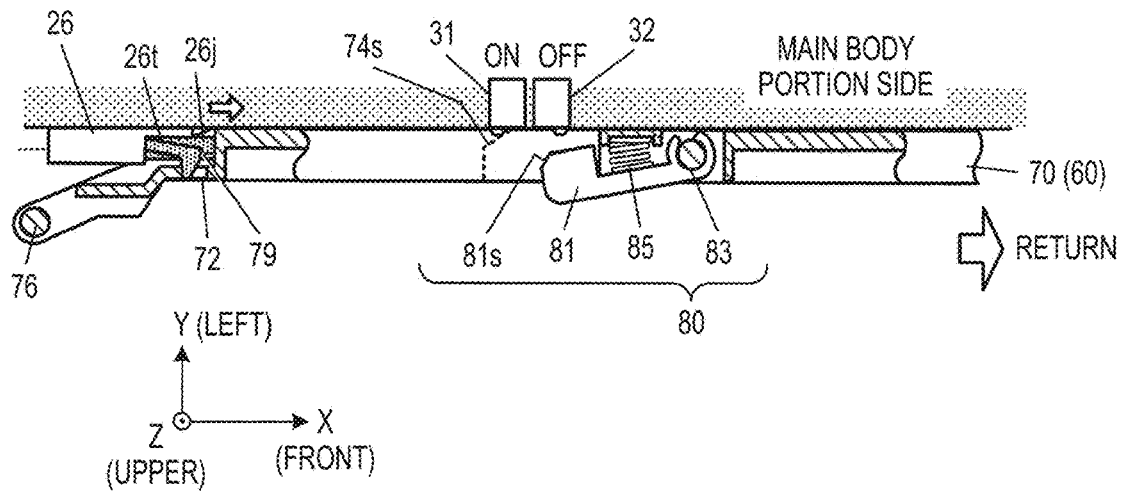
FIG. 14 is a state transition diagram for explaining the procedure of attaching the key tray portion to the main body portion.
Figure 15:
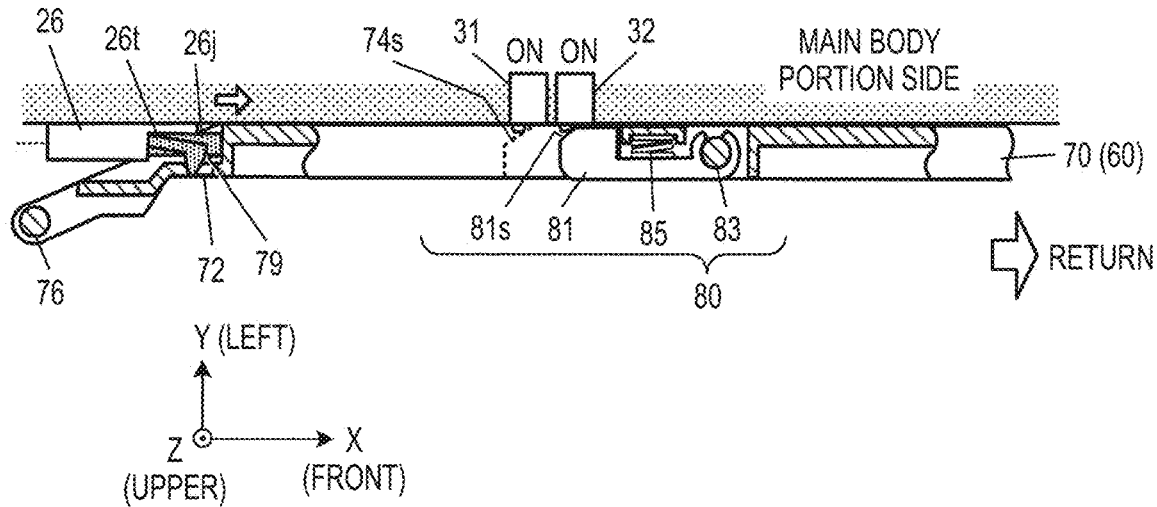
FIG. 15 is a state transition diagram for explaining the procedure of attaching the key tray portion to the main body portion.

FIGS. 13, 14, and 15 are state transition diagrams for explaining a procedure of attaching the key tray portion 60 to the main body portion 12, and are cross-sectional views in the X-Y direction selectively illustrating the peripheries of the lid portion 70. The attachment detection switch unit 31 is originally disposed side by side along the Z-axis direction together with the key detection switch unit 32 (see FIG. 6). However, in order to make the explanation easier to understand, the attachment detection switch unit 31 is shown shifted in the X-axis minus direction (to the left side as viewed in FIGS. 13, 14, and 15) from the original position as in FIGS. 11 and 12. In FIGS. 13, 14, and 15, the front end portion of the window portion 74 is indicated by a dashed line shifted from the rear end portion of the lever 81 in the X-axis minus direction as in FIGS. 11 and 12. The inclined surface 74s is provided on the front end side of the window portion 74 in the lid portion 70, and the inclined surface 81s is provided on the rear end portion of the lever 81.

In order to attach the key tray portion 60 to the main body portion 12, the user inserts the key tray portion 60 into the tray attachment portion 16 while matching with the shape of the incorrect assembly prevention structure 65 (see FIG. 3).

When the inserted key tray portion 60 reaches the engaging portion 26, the engaging portion 26 transitions from the disengaged state to the engaged state. Specifically, when the stepped portion 79 of the lid portion 70 is in contact with the passive portion 26j and the user continues the insertion operation, the passive portion 26j is pushed in the X-axis minus direction as shown in FIG. 13. The passive portion 26j is slightly pushed back in the X-axis plus direction by a repulsive force of the spring incorporated in the engaging portion 26 as shown in FIG. 14 and stops. This slight push-back is transmitted to fingers of the user as a tactile sense of snapping, and informs that the key tray portion 60 is safely attached to the main body portion 12.

When the passive portion 26j is pushed in the X-axis minus direction while the engaging protrusion 26t does not protrude, the engaging portion 26 makes the engaging protrusion 26t protrude in the Y-axis minus direction. The engaging protrusion 26t is fitted into the engaging hole 72 that reaches the position of the protruding end thereof, so that the engaging portion 26 and the lid portion 70 are engaged with each other. In other words, the key tray portion 60 is attached to the main body portion 12, and the key tray portion 60 maintains the attached state without falling off from the main body portion 12 regardless of the mounting posture of the apparatus 10 with respect to the vehicle 5 of the apparatus 10.

As for the switch unit 30, as shown in FIG. 14, when the key tray portion 60 is attached to the main body portion 12, the attachment detection switch unit 31 comes into contact with the inclined surface 74s of the lid portion 70 and the detection state thereof is switched from the OFF state to the ON state. In other words, the attachment detection switch unit 31 comes into contact with the inclined surface 74s of the lid portion 70 at the timing when the engaging protrusion 26t is fitted into the engaging hole 72 so that the engaging portion 26 and the lid portion 70 are engaged with each other, and the detection state thereof is switched from the OFF state to the ON state.

When the key tray portion 60 in which the electronic key 90 is not accommodated is attached, the detection state of the key detection switch unit 32 remains the OFF state even when the attachment is completed. Specifically, the lever 81 is in a state of swinging in the Y-axis minus direction due to the bias of the coil spring 85. An outer surface of the swinging end of the lever 81 in the Y-axis plus direction is positioned inside the accommodating portion 61 relative to the outer surface of the lid portion 70 in the Y-axis plus direction, and is recessed from the outer surface of the lid portion 70 in the Y-axis plus direction. Therefore, at the timing when the engaging protrusion 26t is fitted into the engaging hole 72 and the engaging portion 26 and the lid portion 70 are engaged with each other, the key detection switch unit 32 enters a portion recessed from the outer surface of the lid portion 70 in the Y-axis plus direction and is not pushed by the lever 81. Since the inclined surface 81s of the lever 81 is not substantially flush with the inclined surface 74s of the lid portion 70, the key detection switch unit 32 is not in contact with the inclined surface 81s of the lever 81 and the detection state thereof remains the OFF state. Since the detection state is the OFF state, the control unit 40 detects that the electronic key 90 is not accommodated in the key tray portion 60 and recognizes that the key tray portion 60 is attached to the main body portion 12.

On the other hand, when the user forgets to take out the electronic key 90 from the key tray portion 60 and attaches the key tray portion 60 accommodating the electronic key 90, the key detection switch unit 32 is switched from the OFF state to the ON state as shown in FIG. 15. Specifically, when the electronic key 90 is accommodated in the key tray portion 60, the lever 81 is in contact with the push button disposition surface of the electronic key 90, and the outer surface of the swinging end in the Y-axis plus direction is positioned substantially flush with the outer surface of the lid portion 70 in the Y-axis plus direction. The key detection switch unit 32 is pushed by the outer surface of the swinging end in the Y-axis plus direction and becomes the ON state. By becoming the ON state, the control unit 40 detects that the key tray portion 60 accommodating the electronic key 90 is attached.

Figure 16:
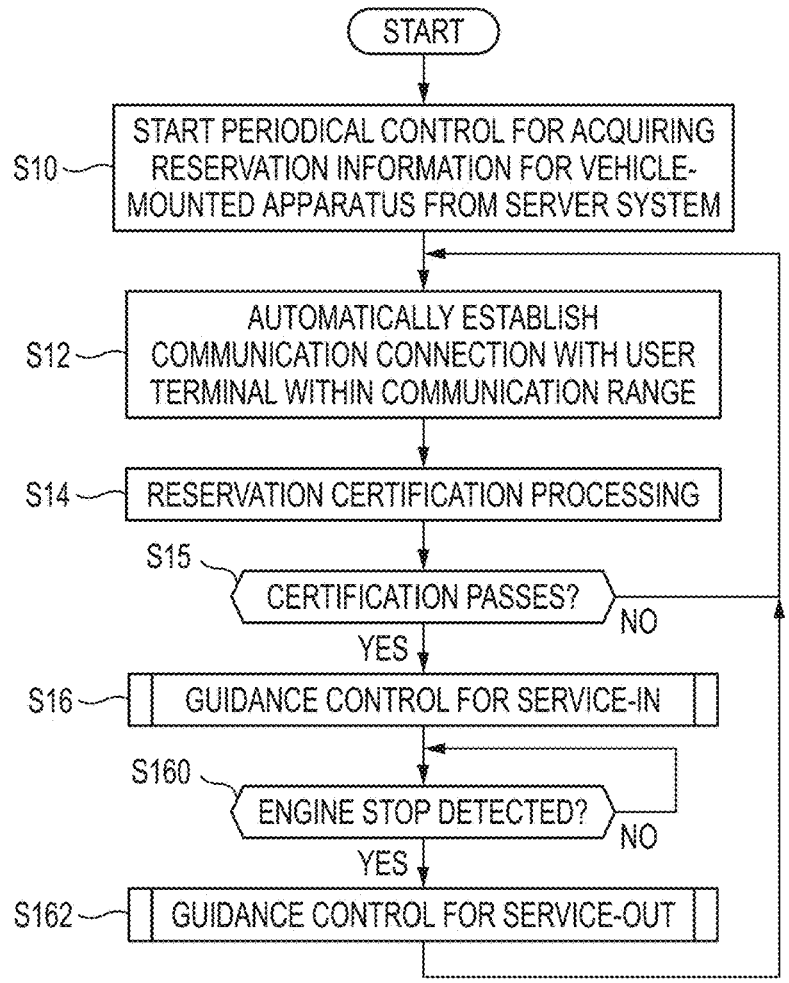
FIG. 16 is a flowchart for explaining a flow of processing of the in-vehicle device from a start of use to an end of use of a vehicle.

FIG. 16 is a flowchart for explaining a flow of processing in the apparatus 10 from a start of use (service-in) of the vehicle 5 to be shared reserved by the user to an end of use (service-out).

The flow of processing described below is implemented by the CPU 41 of the control unit 40 reading out a program from the IC memory 42 and executing the program (see FIG. 4). As a premise, the apparatus 10 accommodates the regular electronic key 90 of the vehicle 5 on which the apparatus 10 is mounted. It is assumed that the user causes the terminal program 502 (see FIG. 1) to be executed on the user terminal 1500.

When power is supplied to the apparatus 10, the CPU 41 automatically reads a program from the IC memory 42 and starts executing the program. When the execution of the program is started, the apparatus 10 starts controlling to periodically communicate with the server system 1100 using the first communication unit 43, acquire a copy of the reservation information 700 of the vehicle 5 from the server system 1100, and store the copy as the reservation information for in-vehicle device 700c (see FIG. 1) in the IC memory 42 (step S10).

The apparatus 10 to which power is supplied automatically detects a communication connection with the user terminal 1500 existing within a communication range of the second communication unit 44 (short-range wireless), and establishes a communication connection with the detected user terminal 1500 (step S12), and executes reservation certification processing (step S14).

In the reservation certification processing, various certifications relating to the start of use of the vehicle 5 are performed based on the reservation information. For example, the apparatus 10 acquires the reservation information for user 700t (see FIG. 1) from the user terminal 1500 and compares the reservation information for user 700t with the reservation information for in-vehicle device 700c. Reservation date and time are compared with the current date and time. Certifications of user account, password, and the like may be performed as appropriate.

If the reservation certification is passed (YES in step S15), the apparatus 10 executes guidance control for service-in (step S16).

Figure 17:
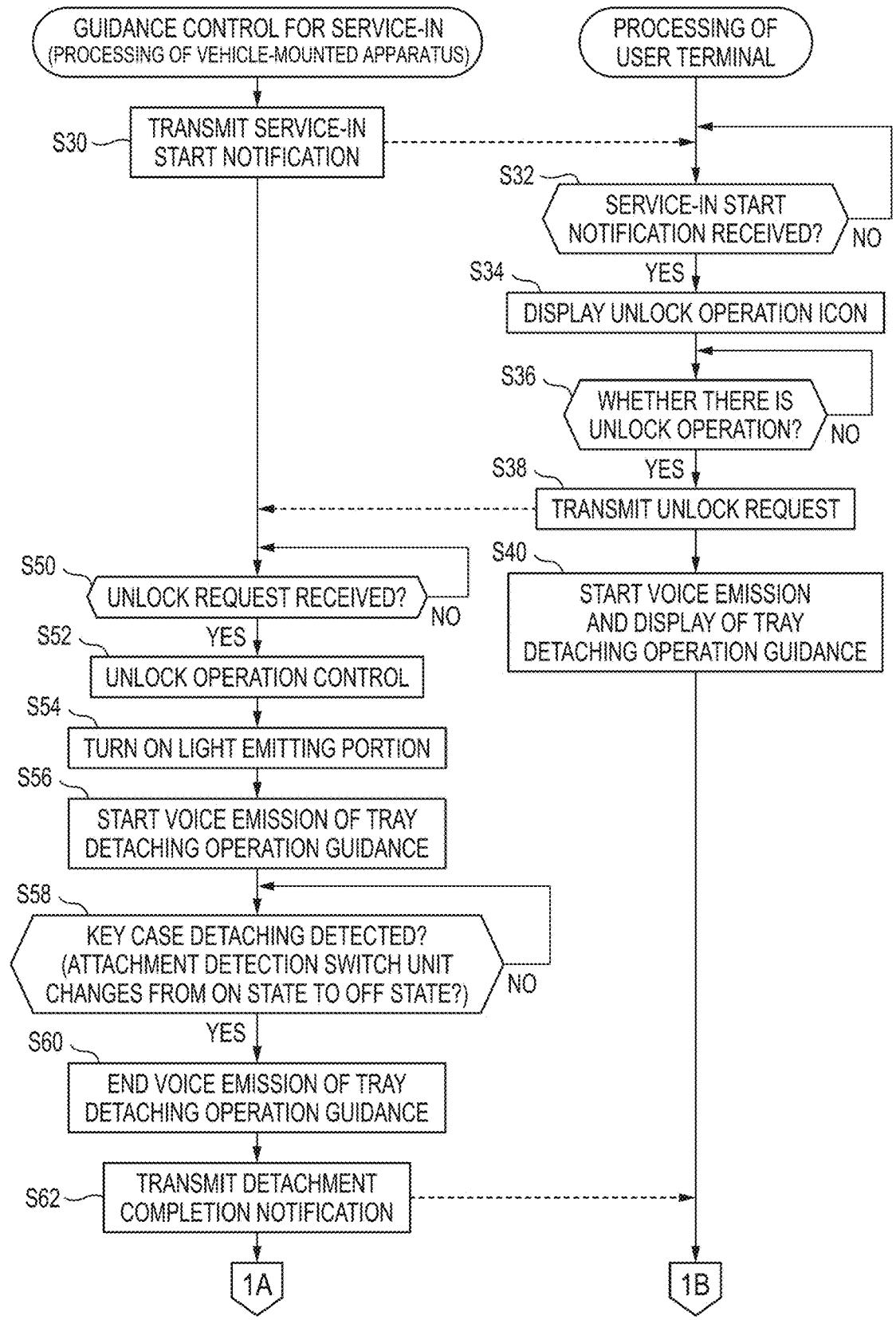
FIG. 17 is a flowchart for explaining a flow of processing of the in-vehicle device relating to guidance control for service-in and a flow of processing of a user terminal.
Figure 18:
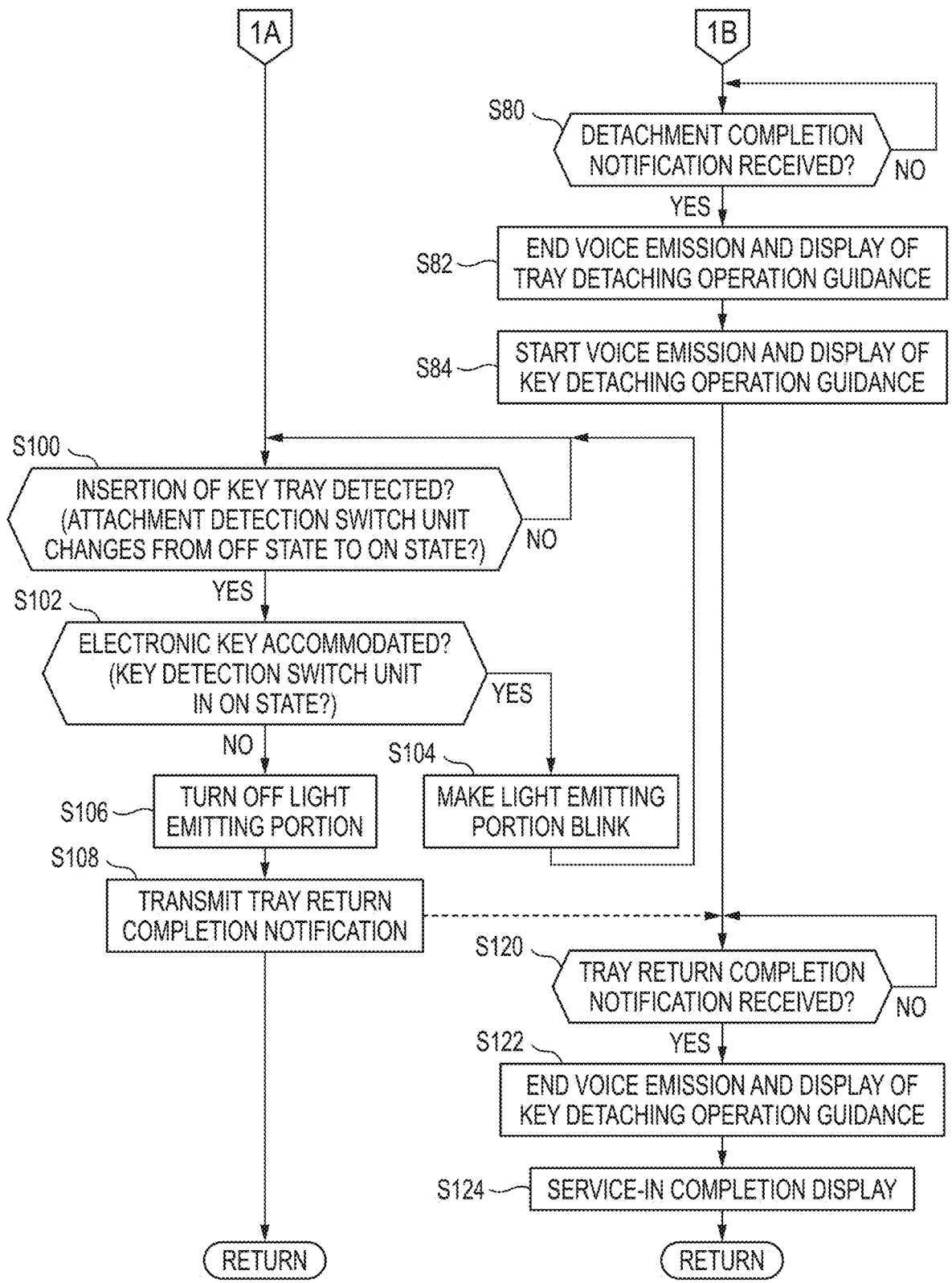
FIG. 18 is a flowchart continued from FIG. 17.

FIGS. 17 and 18 are flowcharts for explaining a flow of processing of the apparatus 10 relating to the guidance control for service-in and a flow of processing of the user terminal 1500. In the guidance control for service-in, the apparatus 10 transmits a predetermined service-in start notification to the user terminal 1500 (step S30).

Upon receiving the service-in start notification (YES in step S32), the user terminal 1500 displays a predetermined unlock operation icon on a screen (step S34), and receives an unlock operation input by the user. The user terminal 1500 determines that there is an unlock operation based on the operation input to the icon (YES in step S36), and transmits a predetermined unlock request to the apparatus 10 (step S38).

Next, the user terminal 1500 emits a reading voice of tray detaching operation guidance as a part of the guidance for service-in from the speaker of the user terminal 1500 (step S40) and displays a screen.

Figure 19:
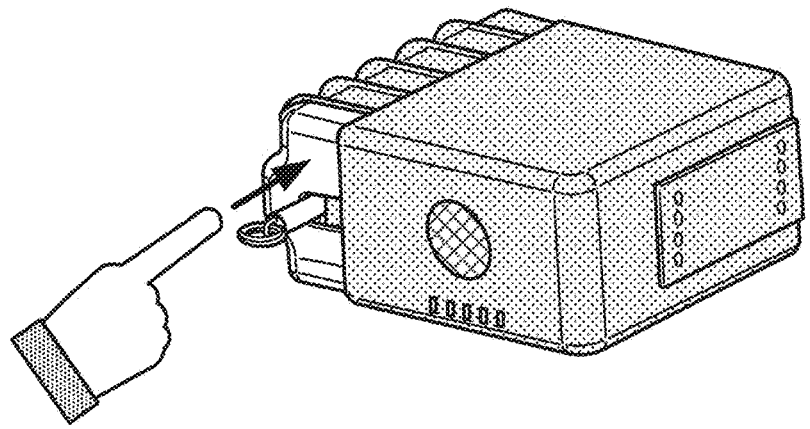

The display of the tray detaching operation guidance is, for example, as shown in FIG. 19, is a content for prompting the user to push the front surface of the tray attachment portion 16 with his or her fingertips. The reading voice is a voice that explains the content of the operation in words.

Returning to FIG. 17, when receiving the unlock request (YES in step S50), the apparatus 10 drives and controls the first actuator 21 to unlock the door of the vehicle 5 (step S52). Then, the apparatus 10 turns on the light emitting portion 28 (step S54), and starts emitting the reading voice of the tray detaching operation guidance for service-in from the speaker 23 (step S56).

The user can be notified of the mounting position of the apparatus 10 in the vehicle 5 by causing the apparatus 10 to emit the reading voice of the tray detaching operation guidance. When the light emitting portion 28 lights up (including blinking), the emitted light enters the light guide portion 62 of the key tray portion 60 and scatters, so that the entire key tray portion 60 appears to glow. The light from the light emitting portion 28 also enters the light guiding and scattering portion 29 of the main body portion 12 and illuminates the inside of the tray attachment portion 16. With these lights, the user can know positions to be operated indicated by the voice guidance.

Even when the apparatus 10 is mounted on a dark place in a glove box or in a dark environment such as at night or in bad weather, the confirmation of the mounting position of the apparatus 10 by the user and the operation of attaching and detaching the key tray portion 60 by the user are much easier than when there is no voice guidance or the scattered light of the key tray portion 60.

The apparatus 10 can detect detachment of the key tray portion 60 by the change of the attachment detection switch unit 31 from the ON state to the OFF state. When the detachment of the key tray portion 60 is detected after starting the voice emission of the tray detaching operation guidance for service-in (YES in step S58), the apparatus 10 ends the emission of the reading voice of the tray detaching operation guidance (step S60). Then, the apparatus 10 transmits a predetermined detachment completion notification to the user terminal 1500 while keeping the light emitting portion 28 lit (step S62).

Shifting to FIG. 18, when receiving the detachment completion notification (YES in step S80), the user terminal 1500 ends the emission of the reading voice of the tray detaching operation guidance and the guide display (step S82), and starts emitting a reading voice of key detachment guidance and guide display (step S84).

Figure 20:
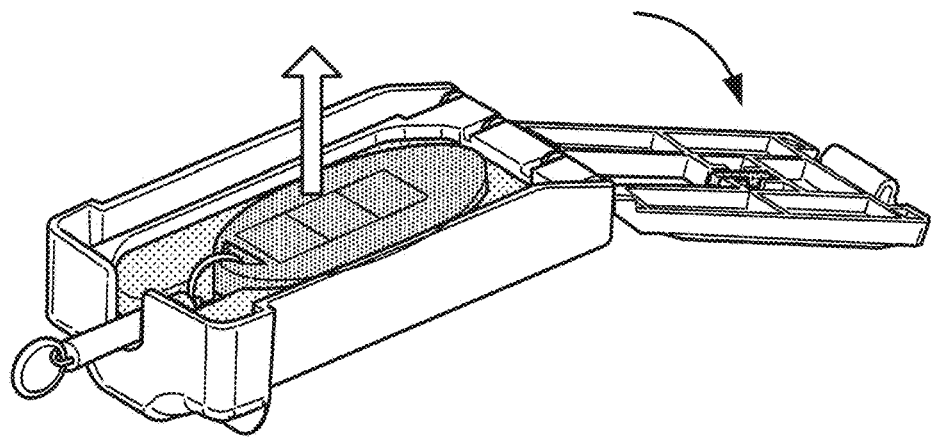
Figure 21:
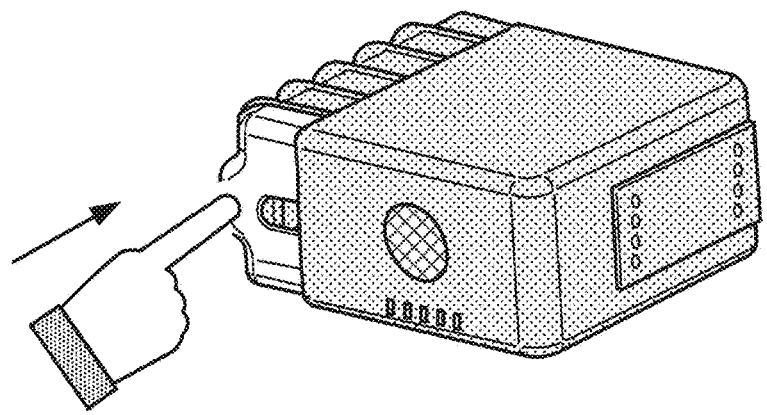

For example, the key detachment guidance alternately performs a display for prompting the user to open the lid portion 70 of the key tray portion 60 and detaching the electronic key 90 as shown in FIG. 20, and a display for prompting the user to attach the key tray portion 60 in which the electronic key 90 is not accommodated to the apparatus 10 as shown in FIG. 21. The reading voice is a voice that explains the content of these displays in words.

The user understands the detachment of the electronic key 90 accommodated in the apparatus 10 and operation contents after the electronic key 90 is detached from the apparatus 10 by the voice of the key detachment guidance and the guide display. The user operates the snap fit 78 to open the lid portion 70 and detaches the electronic key 90 from the key tray portion 60 using the connecting member 94 as a purchase. Then, after the detachment, the lid portion 70 is closed, and the key tray portion 60 in which the electronic key 90 is not accommodated is inserted into the tray attachment portion 16 of the main body portion 12.

The user can know where to insert the key tray portion 60 since the light guiding and scattering portion 29 brightly illuminates the inner surface of the cylindrical space of the tray attachment portion 16. Since the incorrect assembly prevention structure 65 of the tray attachment portion 16 is also brightly illuminated, it is easy to match with the direction of the key tray portion 60.

Returning to FIG. 18, the apparatus 10 monitors the attachment of the key tray portion 60 in which the electronic key 90 is not accommodated after transmitting the detachment completion notification. Although the attachment detection switch unit 31 is changed from the OFF state to the ON state and it is detected that the key tray portion 60 is inserted (YES in step S100), if the key detection switch unit 32 is in the ON state (YES in step S102), the apparatus 10 assumes that the key is forgotten to be detached from the key tray portion 60, and changes a lighting control pattern so that the light emitting portion 28 performs predetermined blinking for alerting (step S104).

If the key tray portion 60 is inserted (YES in step S100) and the key detection switch unit 32 is in the OFF state (NO in step S102), the apparatus 10 determines that the empty key tray portion 60 is returned to the tray attachment portion 16, and then turns off the light emitting portion 28 (step S106), and transmits a tray return completion notification to the user terminal 1500 (step S108), and then ends the guidance control for service-in.

When receiving the tray return completion notification (YES in step S120), the user terminal 1500 ends the emission of the key detachment guidance and the guidance display (step S122), and performs service-in completion display indicating that the service-in is successfully completed (step S124). The service-in completion display may include an advance notice briefly indicating a procedure of service-out.

Returning to FIG. 16, after executing the guidance control for service-in, the apparatus 10 sequentially acquires the latest information of the vehicle 5 from the in-vehicle network communication IC 45 and monitors engine stop. If the engine is stopped (YES in step S160), the apparatus 10 executes the guidance control for service-out (step S162).

Figure 22:
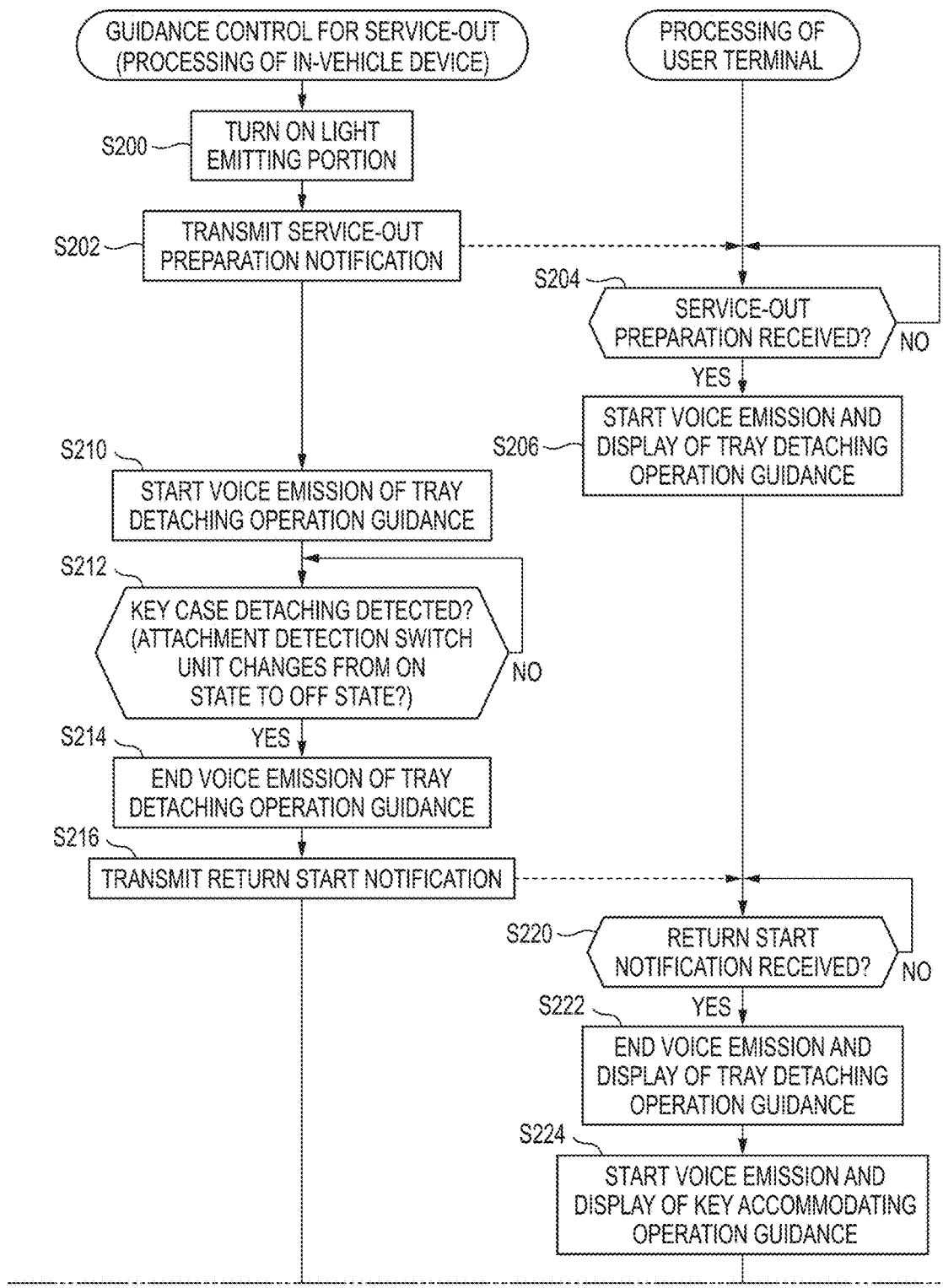
FIG. 22 is a flowchart for explaining a flow of processing of the in-vehicle device relating to guidance control for service-out and a flow of processing of the user terminal.
Figure 23:
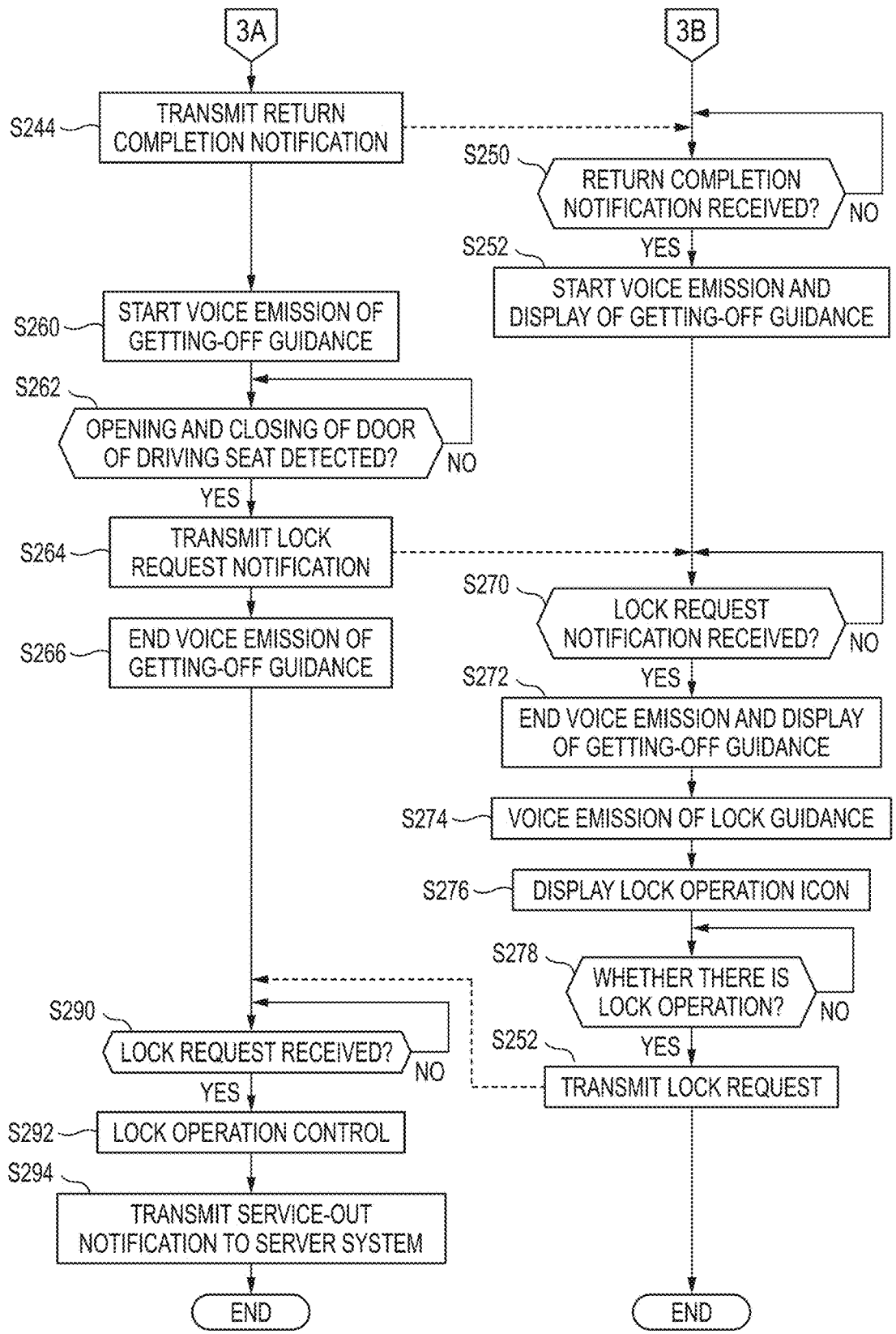
FIG. 23 is a flowchart continued from FIG. 22.

FIGS. 22 and 23 are flowcharts for explaining a flow of processing of the apparatus 10 relating to the guidance control for service-out and a flow of processing of the user terminal 1500. The apparatus 10 turns on the light emitting portion 28 (step S200), and transmits a service-out preparation notification to the user terminal 1500 (step S202).

When receiving the service-out preparation notification (YES in step S204), the user terminal 1500 starts emitting the reading voice of the tray detaching operation guidance and the guidance display (step S206; see FIG. 19).

The apparatus 10 that transmits the service-out preparation notification starts emitting the reading voice of the tray detaching operation guidance (step S210), and monitors the detachment of the key tray portion 60.

When the attachment detection switch unit 31 changes from the ON state to the OFF state and it is detected that the key tray portion 60 is detached (YES in step S212), the apparatus 10 ends the emission of the reading voice of the tray detaching operation guidance (step S214), and transmits a predetermined return start notification to the user terminal 1500 (step S216).

When receiving the return start notification (YES in step S220), the user terminal 1500 ends the emission of the reading voice of the tray detaching operation guidance and the guidance display (step S222), and starts emitting a reading voice of key accommodating operation guidance and guidance display (step S224).

Figure 24:
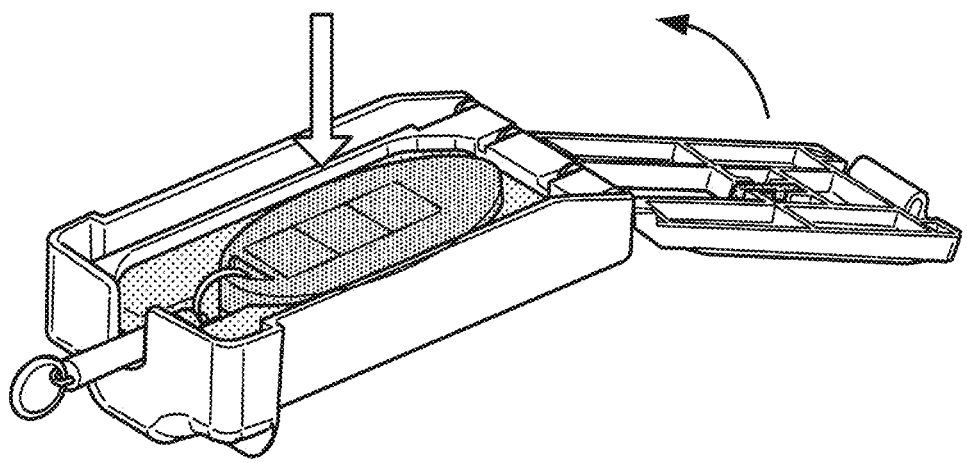
FIG. 24 is a diagram illustrating an example of guide display in the guidance control for service-out.
Figure 25:
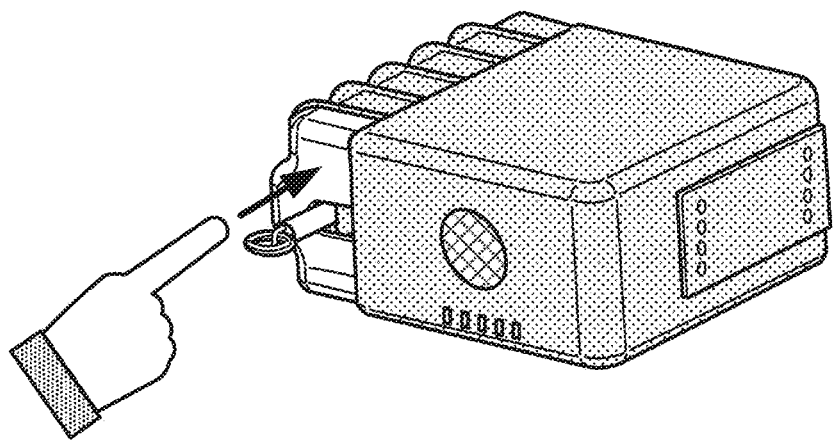
FIG. 25 is a diagram illustrating an example of guide display in the guidance control for service-out.

The key accommodating operation guidance guides a procedure of re-accommodating the electronic key 9) in the key tray portion 60 whose accommodating portion 61 is empty after the electronic key 90 is detached and returning the key tray portion 60 to the apparatus 10. For example, as shown in FIG. 24, a guide display is performed to guide to operate the snap fit 78 of the empty key tray portion 60 to open the lid portion 70, make a push button operating surface of the electronic key 90 face the opening direction of the key tray portion 60, and to accommodate the connecting member 94 in a posture facing forward. A guide display shown in FIG. 25 is performed alternately with the guide display shown in FIG. 24, to guide to insert and attach the key tray portion 60 accommodating the electronic key 90 into the tray attachment portion 16 of the apparatus 10. The reading voice is a voice that explains the content of the guide display in words.

After transmitting an accommodation start notification, the apparatus 10 starts emitting a reading voice of key end operation guidance (step S230), and monitors attachment of the key tray portion 60. Although the attachment detection switch unit 31 is changed from the OFF state to the ON state and it is detected that the key tray portion 60 is inserted (YES in step S232), if the key detection switch unit 32 remains in the OFF state (NO in step S234), the apparatus 10 assumes that the key tray portion 60 is returned without the electronic key 90 being accommodated therein, and changes the lighting control so that the light emitting portion 28 performs the predetermined blinking for alerting (step S236).

If it is detected that the key tray portion 60 is inserted (YES in step S232), and if the key detection switch unit 32 is changed from the OFF state to the ON state and it is detected that the electronic key 90 is accommodated in the key tray portion 60 (YES in step S234), the apparatus 10 assumes that the electronic key 90 and the key tray portion 60 are correctly returned. Then, the apparatus 10 turns off the light emitting portion 28 (step S240), and ends emitting the reading voice of the key accommodating operation guidance (step S242).

Shifting to FIG. 23, the apparatus 10 transmits a predetermined return completion notification to the user terminal 1500 (step S244). When receiving the return completion notification (YES in step S250), the user terminal 1500 starts emitting a reading voice of getting-off guidance and guide display (step S252). The getting-off guidance guides the user to get off the vehicle 5 and perform a lock operation.

After transmitting the return completion notification, the apparatus 10 starts emitting the reading voice of the getting-off guidance (step S260), and monitors opening and closing of a door of a driving seat. If the door of the driving seat is opened and then closed (YES in step S262), the apparatus 10 assumes that the user gets off the vehicle. Then, the apparatus 10 transmits a predetermined lock request notification to the user terminal 1500 (step S264), and ends the emission of the reading voice of the getting-off guidance (step S266).

When receiving the lock request notification (YES in step S270), the user terminal 1500 ends the emission of the reading voice of the getting-off guidance and the guide display (step S272), emits a reading voice of lock guidance for prompting the user to lock the vehicle 5 by touching the lock operation icon (step S274), and displays a predetermined lock icon (step S276).

When an operation input to the lock operation icon is detected (YES in step S278), the user terminal 1500 transmits a predetermined lock request to the apparatus 10 (step S280).

When receiving the lock request (YES in step S290), the apparatus 10 executes lock operation control to operate the second actuator 22 (step S292), accesses the server system 1100, transmits a predetermined service-out notification (step S294), and ends the guidance control for service-out.

As described above, according to the present embodiment, the convenience of the apparatus 10 that accommodates the electronic key 90 can be improved. By accommodating the electronic key 90 in the apparatus 10 in the detachable key tray portion 60 and making it easier to detach the electronic key 90 from the key tray portion 60, it is possible to achieve the apparatus 10 with improved convenience.

Summary

The disclosure of the present description including the above embodiment can be summarized as follows.

An aspect of the present disclosure is an vehicle-mounted apparatus, including: a main body portion; and an electronic key accommodating portion that accommodates an electronic key of a vehicle and is attachable to and detachable from the main body portion, in which the electronic key accommodating portion includes a switching unit that switches detection states of a first detection unit and a second detection unit according to an attachment or detachment operation of the electronic key accommodating portion to or from the main body portion, and the first detection unit is provided in the main body portion for detecting an accommodation state of the electronic key in the electronic key accommodating portion, and the second detection unit is provided in the main body portion for detecting an attachment or detachment state of the electronic key accommodating portion with respect to the main body portion.

According to this aspect, both the accommodation state in the electronic key accommodating portion and the attachment or detachment state of the electronic key accommodating portion with respect to the main body portion can be reliably detected according to the attachment or detachment operation of the electronic key accommodating portion to or from the main body portion. Therefore, it is possible to improve the convenience of the vehicle-mounted apparatus that accommodates the electronic key.

The electronic key accommodating portion may include a movable portion that is displaced according to the accommodation state of the electronic key, and the first detection unit may detect the accommodation state of the electronic key in the electronic key accommodating portion according to a displacement state of the movable portion.

The movable portion may be positioned to be in contact with a push button disposition surface of the electronic key accommodated in the electronic key accommodating portion.

The electronic key accommodating portion may include an accommodating portion for accommodating the electronic key, and a lid portion for opening and closing an opening on the accommodating portion, and the switching unit may be provided on the lid portion.

The switching unit may include a window portion for exposing the push button of the electronic key accommodated in the accommodating portion of the electronic key accommodating portion, and the main body portion may include an actuator that pushes the push button of the electronic key through the window portion with the electronic key accommodating portion attached to the main body portion.

The main body portion may include a through-shaped tray attachment portion to which the electronic key accommodating portion is attached.

By forming the tray attachment into the through shape, it becomes easier to find and remove foreign matters that enter the tray attachment portion.

The main body portion may include a strength structure provided on an outer side of the tray attachment portion, and the tray attachment portion may include a planar inner surface.

By making the inner surface flat while ensuring the strength of the tray attachment portion, it is possible to smoothly insert and detach the tray attachment portion into and from the electronic key accommodating portion. It also becomes easier to find and remove the foreign matters that enter the tray attachment portion.

The main body portion may include an engaging portion that switches between an engaged state of engaging with the electronic key accommodating portion attached to the main body portion and a disengaged state of not engaging with the electronic key accommodating portion.

The electronic key accommodating portion may include a light guide portion made of a light guiding material, and the main body portion may include a light emitting portion that emits light toward the light guide portion of the electronic key accommodating portion in an attached state.

By forming a part or all of the electronic key accommodating portion from a light guiding material, the light emitted from the light emitting portion can be guided and scattered to illuminate the light guide portion. Therefore, the user can immediately understand where to operate. The brightness makes it easier to operate the vehicle-mounted apparatus in a dark environment.

An incorrect assembly prevention structure for making the electronic key accommodating portion attachable to the main body portion in a predetermined relative posture between the main body portion and the electronic key accommodating portion may be further provided.

A communication unit that communicates with a user terminal of a user who uses the vehicle; an actuator that pushes the electronic key accommodated in the electronic key accommodating portion when the electronic key accommodating portion is attached to the main body portion; and an operation control unit that operates the actuator when an instruction to open or close a door of the vehicle is received from the user terminal via the communication unit, may be further provided.

A control unit that performs guidance control based on a combination of a detection result of the first detection unit and a detection result of the second detection unit may be further provided.

REFERENCE SIGNS LIST

5: vehicle
10: vehicle-mounted apparatus
12: main body portion
16: tray attachment portion
18: strength structure
21: first actuator
22: second actuator
26: engaging portion
28: light emitting portion
29: light guiding and scattering portion
30: switch unit
31: attachment detection switch unit
32: key detection switch unit
40: control unit
43: first communication unit
44: second communication unit
46: operation control unit
60: key tray portion (electronic key accommodating portion)
61: accommodating portion
62: light guide portion
65: incorrect assembly prevention structure
70: lid portion
74: window portion
80: movable portion
90: electronic key
91: unlock push button
92: lock push button
1100: server system
1500: user terminal

The invention claimed is:

1. A vehicle-mounted apparatus comprising:
a main body portion; and
an electronic key accommodating portion that accommodates an electronic key of a vehicle and is attachable to and detachable from the main body portion, wherein
the electronic key accommodating portion includes a switching unit that switches detection states of a first detection unit and a second detection unit according to an attachment or detachment operation of the electronic key accommodating portion to or from the main body portion,
the first detection unit is provided in the main body portion for detecting an accommodation state of the electronic key in the electronic key accommodating portion, and
the second detection unit is provided in the main body portion for detecting an attachment or detachment state of the electronic key accommodating portion with respect to the main body portion.

2. The vehicle-mounted apparatus according to claim 1, wherein
the electronic key accommodating portion includes a movable portion that is displaced according to the accommodation state of the electronic key, and
the first detection unit detects the accommodation state of the electronic key in the electronic key accommodating portion according to a displacement state of the movable portion.

3. The vehicle-mounted apparatus according to claim 2, wherein
the movable portion is positioned to be in contact with a push button disposition surface of the electronic key accommodated in the electronic key accommodating portion.

4. The vehicle-mounted apparatus according to claim 2, wherein
the electronic key accommodating portion includes:
an accommodating portion for accommodating the electronic key; and
a lid portion for opening and closing an opening on the accommodating portion, and
the switching unit is provided on the lid portion.

5. The vehicle-mounted apparatus according to claim 1, wherein
the switching unit includes a window portion for exposing the push button of the electronic key accommodated in the accommodating portion of the electronic key accommodating portion, and
the main body portion includes an actuator that pushes the push button of the electronic key through the window portion with the electronic key accommodating portion attached to the main body portion.

6. The vehicle-mounted apparatus according to claim 1, wherein
the main body portion includes a through-shaped tray attachment portion to which the electronic key accommodating portion is attached.

7. The vehicle-mounted apparatus according to claim 6, wherein
the main body portion includes a strength structure provided on an outer side of the tray attachment portion, and
the tray attachment portion includes a planar inner surface.

8. The vehicle-mounted apparatus according to claim 1, wherein
the main body portion includes an engaging portion that switches between an engaged state of engaging with the electronic key accommodating portion attached to the main body portion and a disengaged state of not engaging with the electronic key accommodating portion.

9. The vehicle-mounted apparatus according to claim 1, wherein
the electronic key accommodating portion includes a light guide portion made of a light guiding material, and
the main body portion includes a light emitting portion that emits light toward the light guide portion of the electronic key accommodating portion in an attached state.

10. The vehicle-mounted apparatus according to claim 1, further comprising:
an incorrect assembly prevention structure for making the electronic key accommodating portion attachable to the main body portion in a predetermined relative posture between the main body portion and the electronic key accommodating portion.

11. The vehicle-mounted apparatus according to claim 1, further comprising:
a communication unit that communicates with a user terminal of a user who uses the vehicle;

an actuator that pushes the electronic key accommodated in the electronic key accommodating portion when the electronic key accommodating portion is attached to the main body portion; and an operation control unit that operates the actuator when an instruction to open or close a door of the vehicle is received from the user terminal via the communication unit.

12. The vehicle-mounted apparatus according to claim 1, further comprising:

a control unit that performs guidance control based on a combination of a detection result of the first detection unit and a detection result of the second detection unit.

* * * * *